US012521418B2

(12) United States Patent
Kourembanas et al.

(10) Patent No.: US 12,521,418 B2
(45) Date of Patent: Jan. 13, 2026

(54) MESENCHYMAL STROMAL CELL EXOSOMES AND USES THEREOF

(71) Applicant: Children's Medical Center Corporation, Boston, MA (US)

(72) Inventors: Stella Kourembanas, Newton, MA (US); S. Alexander Mitsialis, Newton, MA (US)

(73) Assignee: Children's Medical Center Corporation, Boston, MA (US)

( * ) Notice: Subject to any disclaimer, the term of this patent is extended or adjusted under 35 U.S.C. 154(b) by 1204 days.

(21) Appl. No.: 17/051,744

(22) PCT Filed: Apr. 26, 2019

(86) PCT No.: PCT/US2019/029275
§ 371 (c)(1),
(2) Date: Oct. 29, 2020

(87) PCT Pub. No.: WO2019/217091
PCT Pub. Date: Nov. 14, 2019

(65) Prior Publication Data
US 2021/0137989 A1 May 13, 2021

Related U.S. Application Data

(60) Provisional application No. 62/664,696, filed on Apr. 30, 2018.

(51) Int. Cl.
*A61K 35/28* (2015.01)
*A61K 9/00* (2006.01)
*A61P 11/00* (2006.01)

(52) U.S. Cl.
CPC ............ *A61K 35/28* (2013.01); *A61K 9/0019* (2013.01); *A61P 11/00* (2018.01)

(58) Field of Classification Search
CPC ........ A61K 35/28; A61K 9/0019; A61P 11/00
See application file for complete search history.

(56) References Cited

U.S. PATENT DOCUMENTS

| | | | |
|---|---|---|---|
| 6,685,911 B1 | 2/2004 | Zitvogel et al. | |
| 8,476,017 B2 | 7/2013 | Pietrzkowski | |
| 9,427,450 B2 | 8/2016 | Ichim et al. | |
| 9,901,600 B2 | 2/2018 | Mitsialis et al. | |
| 10,624,929 B2 | 4/2020 | Mitsialis et al. | |
| 11,274,139 B2 | 3/2022 | El Andaloussi et al. | |
| 11,759,481 B2 | 9/2023 | Mitsialis et al. | |
| 2004/0214783 A1 | 10/2004 | Terman | |
| 2006/0286089 A1 | 12/2006 | Berenson et al. | |
| 2009/0274665 A1 | 11/2009 | Akabutu et al. | |
| 2010/0003272 A1 | 1/2010 | Sieweke | |
| 2011/0003008 A1 | 1/2011 | Lim | |
| 2011/0014251 A1 | 1/2011 | Ray | |
| 2012/0009578 A1 | 1/2012 | Pietrzkowski | |
| 2013/0143314 A1 | 6/2013 | Shiels et al. | |
| 2013/0195899 A1 | 8/2013 | Ichim et al. | |
| 2013/0273011 A1 | 10/2013 | Ichim et al. | |
| 2014/0065240 A1 | 3/2014 | Mitsialis et al. | |
| 2015/0017122 A1 | 1/2015 | Rolfo et al. | |
| 2015/0125950 A1 | 5/2015 | Lim et al. | |
| 2015/0190429 A1 | 7/2015 | Beelen et al. | |
| 2015/0190430 A1 | 7/2015 | Lim | |
| 2016/0082042 A1 | 3/2016 | Hematti et al. | |
| 2016/0137716 A1 | 5/2016 | El Andaloussi et al. | |
| 2016/0190430 A1 | 6/2016 | Henning et al. | |
| 2016/0220613 A1 | 8/2016 | Lim | |
| 2017/0258840 A1 | 9/2017 | Mitsialis et al. | |
| 2017/0258845 A1 | 9/2017 | Lim | |
| 2017/0360840 A1 | 12/2017 | Hogan et al. | |
| 2018/0221412 A1 | 8/2018 | Mitsialis et al. | |
| 2018/0273906 A1* | 9/2018 | Ashraf | A61K 31/713 |
| 2019/0249144 A1 | 8/2019 | Hematti et al. | |
| 2020/0281983 A1 | 9/2020 | Mitsialis et al. | |
| 2021/0128630 A1 | 5/2021 | Mitsialis et al. | |
| 2021/0213056 A1 | 7/2021 | Kourembanas et al. | |
| 2021/0315940 A1 | 10/2021 | Kourembanas et al. | |
| 2022/0023347 A9 | 1/2022 | Mitsialis et al. | |
| 2022/0096560 A1 | 3/2022 | Mitsialis et al. | |

FOREIGN PATENT DOCUMENTS

| | | |
|---|---|---|
| CN | 101890050 A | 11/2010 |
| CN | 103648509 A | 3/2014 |
| CN | 103767985 A | 5/2014 |

(Continued)

OTHER PUBLICATIONS

Voysey, M., et al., "The Influence of Maternally Derived Antibody and Infant Age at Vaccination on Infant Vaccine Responses," JAMA Pediatr 171(7): 637-646. doi: 10.1001/jamapediatrics.2017.0638. (Year: 2017).*
Li, B., et al., "Brain-immune interactions in perinatal hypoxic-ischemic brain injury," Prog Neurobiol 159: 50-68. doi: 10.1016/j.pneurobio.2017.10.006. Epub Oct. 27, 2017. (Year: 2017).*
Liu, G., et al., "Umbilical cord-derived mesenchymal stem cells regulate thymic epithelial cell development and function in Foxn1 (−/−) mice," Cell Mol Immunol 11:(3) 275-84. doi: 10.1038/cmi.2013.69. (Year: 2014).*
Vizoso, F. J., et al., "Mesenchymal Stem Cell Secretome: Toward Cell-Free Therapeutic Strategies in Regenerative Medicine," Int J Mol Sci 18(9): 1852. doi: 10.3390/ijms18091852. (Year: 2017).*
Evoli, A.,, and Lancaster, E., "Paraneoplastic disorders in thymoma patients," J Thorac Oncol 9(9 Suppl 2):S143-7. doi: 10.1097/JTO.0000000000000300. (Year: 2014).*
Dixit, V. D., "Thymic fatness and approaches to enhance thymopoietic fitness in aging," Curr Opin Immunol 22(4):521-528. doi: 10.1016/j.coi.2010.06.010. (Year: 2010).*

(Continued)

*Primary Examiner* — Tracy Vivlemore
*Assistant Examiner* — Eric J Rogers
(74) *Attorney, Agent, or Firm* — Wolf, Greenfield & Sacks, P.C.

(57) ABSTRACT

Provided herein are methods of using mesenchymal stromal/stem cell (MCS) exosomes in the treatment of diseases associated with thymic dysfunction. In some embodiments, the MSC exosomes restore thymic architecture and development in a subject having thymic dysfunction (e.g., caused by exposure to hyperoxia). In some embodiments, the subject is a human subject (e.g., a human neonate).

20 Claims, 12 Drawing Sheets

(56) References Cited

FOREIGN PATENT DOCUMENTS

| | | | |
|---|---|---|---|
| CN | 103797131 A | 5/2014 | |
| CN | 106714781 A | 5/2017 | |
| CN | 105769916 B | 7/2019 | |
| JP | 2008-525490 A | 7/2008 | |
| JP | 2014-507482 A | 3/2014 | |
| JP | 2016-507550 A | 3/2016 | |
| JP | 2016-516768 A | 6/2016 | |
| JP | 2017-517505 A | 6/2017 | |
| JP | 2017-526723 A | 9/2017 | |
| JP | 2020-511999 A | 4/2020 | |
| KR | 10-2010-0122087 | 11/2010 | |
| KR | 20120002361 A | 1/2012 | |
| KR | 2013/0116552 A | 10/2013 | |
| WO | WO 2006/071796 A2 | 7/2006 | |
| WO | WO 2007/027156 A1 | 3/2007 | |
| WO | WO 2008/020815 A1 | 2/2008 | |
| WO | WO 2008/060788 A2 | 5/2008 | |
| WO | WO 2009/105044 A1 | 8/2009 | |
| WO | WO 2011/010966 A1 | 1/2011 | |
| WO | WO 2011/053257 A2 | 5/2011 | |
| WO | WO 2012/115885 A1 | 8/2012 | |
| WO | WO 2013/150303 A1 | 10/2013 | |
| WO | WO 2014/028763 A1 | 2/2014 | |
| WO | WO 2014/125277 A1 | 8/2014 | |
| WO | WO 2015/179227 A1 | 11/2015 | |
| WO | WO 2016/043654 A1 | 3/2016 | |
| WO | WO-2017141181 A1 * | 8/2017 | ............ A61K 35/28 |
| WO | WO 2017/218964 A1 | 12/2017 | |
| WO | WO 2018/131779 A1 | 7/2018 | |
| WO | WO 2018/183825 A1 | 10/2018 | |
| WO | WO 2019/217646 A | 11/2019 | |
| WO | WO 2020/051362 A1 | 3/2020 | |

OTHER PUBLICATIONS

Abreu et al., Extracellular vesicles derived from mesenchymal stromal cells: a therapeutic option in respiratory diseases? Stem Cell Res Ther. Apr. 14, 2016;7(1):53. doi: 10.1186/s13287-016-0317-0.
Arslan et al., Mesenchymal stem cell-derived exosomes increase ATP levels, decrease oxidative stress and activate PI3K/Akt pathway to enhance myocardial viability and prevent adverse remodeling after myocardial ischemia/reperfusion injury. Stem Cell Res. May 2013;10(3):301-12. doi: 10.1016/j.scr.2013.01.002. Epub Jan. 14, 2013.
Bouchlaka et al., Human Mesenchymal Stem Cell-Educated Macrophages Are a Distinct High IL-6-Producing Subset that Confer Protection in Graft-versus-Host-Disease and Radiation Injury Models. Biol Blood Marrow Transplant. Jun. 2017;23(6):897-905.
Burrello et al., Stem Cell-Derived Extracellular Vesicles and Immune-Modulation. Front Cell Dev Biol. Aug. 22, 2016;4:83. doi: 10.3389/fcell.2016.00083.
Cruz et al., Systemic Administration of Human Bone Marrow-Derived Mesenchymal Stromal Cell Extracellular Vesicles Ameliorates Aspergillus Hyphal Extract-Induced Allergic Airway Inflammation in Immunocompetent Mice. Stem Cells Transl Med. Nov. 2015;4(11):1302-16. doi: 10.5966/sctm.2014-0280. Epub Sep. 16, 2015.
Curley et al., Mesenchymal stem cells enhance recovery and repair following ventilator-induced lung injury in the rat. Thorax. Jun. 2012;67(6):496-501. doi: 10.1136/thoraxjnl-2011-201059. Epub Nov. 21, 2011.
Ding et al., Effects of hucMSCs-derived Exosome on Proliferation of Mononuclear Macrophage and Secretion of Inflammatory Cytokines IL-8, IL-12. Acta Med Univ Sci Technol Huazhong. 46(1):19-22, 28.
Ding et al., Transplantation of UC-MSCs on collagen scaffold activates follicles in dormant ovaries of POF patients with long history of infertility. Sci China Life Sci. Dec. 2018;61(12):1554-1565. doi: 10.1007/s11427-017-9272-2. Epub Mar. 13, 20183. PMID: 29546669.
Dorronsoro et al., Regenerating the injured kidney with human umbilical cord mesenchymal stem cell-derived exosomes. Stem Cell Res Ther. Apr. 25, 2013;4(2):39. doi: 10.1186/scrt187.
Gelblum et al., Treatment Toxicity From Lung Radiation Therapy in Patients With Underlying Idiopathic Pulmonary Fibrosis. International Journal of Radiation Oncology*Biology*Physics. 2015;93(3): E442. https://doi .org/10.1016/j.ijrobp.2015.07.167 4.
Hansmann et al., Mesenchymal stem cell-mediated reversal of bronchopulmonary dysplasia and associated pulmonary hypertension. Pulm Circ. Apr.-Jun. 2012;2(2):170-81. doi: 10.4103/2045-8932.97603.
Herraiz et al., Fertility rescue and ovarian follicle growth promotion by bone marrow stem cell infusion. Fertil Steril. May 2018;109(5):908-918.e2. doi: 10.1016/j.fertnstert.2018.01.004. Epub Mar. 22, 20182. PMID: 29576341.
Huang et al., Exosomes derived from mesenchymal stem cells and pulmonary hypertension. Journal of Wenzhou Medical University. Jan. 25, 2018;1:1-32.
Kalani et al., Exosomes in neurological disease, neuroprotection, repair and therapeutics: problems and perspectives. Neural Regen Res. Oct. 2015;10(10):1565-7. doi: 10.4103/1673-5374.165305.
Kim et al., Mesenchymal stem cell-educated macrophages: a novel type of alternatively activated macrophages. Exp Hematol. Dec. 2009;37(12):1445-53.
Kourembanas, Exosomes: vehicles of intercellular signaling, biomarkers, and vectors of cell therapy. Annu Rev Physiol. 2015;77:13-27. doi: 10.1146/annurev-physiol-021014-071641. Epub Sep. 25, 2014.
Lai et al., Mesenchymal stem cell exosome: a novel stem cell-based therapy for cardiovascular disease. Regen Med. Jul. 2011;6(4):481-92. doi: 10.2217/rme.11.35.
Laskin et al., Macrophages and tissue injury: agents of defense or destruction? Annu Rev Pharmacol Toxicol. 2011;51:267-88. doi: 10.1146/annurev.pharmtox.010909.105812. Author Manuscript, 25 pages.
Lo Sicco et al., Mesenchymal Stem Cell-Derived Extracellular Vesicles as Mediators of Anti-Inflammatory Effects: Endorsement of Macrophage Polarization. Stem Cells Transl Med. Mar. 2017;6(3):1018-1028. doi: 10.1002/sctm.16-0363. Epub Jan. 31, 2017.
Mansouri et al., Mesenchymal stromal cell exosomes prevent and revert experimental pulmonary fibrosis through modulation of monocyte phenotypes. JCI Insight. Nov. 1, 2019;4(21):e128060. doi: 10.1172/jci.insight.128060.
Mitsialis et al., Stem cell-based therapies for the newborn lung and brain: Possibilities and challenges. Semin Perinatol. Apr. 2016;40(3):138-51. doi: 10.1053/j.semperi.2015.12.002. Epub Jan. 15, 2016.
Monsel et al., Mesenchymal stem cell derived secretome and extracellular vesicles for acute lung injury and other inflammatory lung diseases. Expert Opin Biol Ther. Jul. 2016;16(7):859-71.
Monsel et al., Therapeutic Effects of Human Mesenchymal Stem Cell-derived Microvesicles in Severe Pneumonia in Mice. Am J Respir Crit Care Med. Aug. 1, 2015;192(3):324-36.
Phinney et al. Mesenchymal stem cells use extracellular vesicles to outsource mitophagy and shuttle microRNAs. Nat Commun. Oct. 7, 2015;6:8472.
Pierro et al., Short-term, long-term and paracrine effect of human umbilical cord-derived stem cells in lung injury prevention and repair in experimental bronchopulmonary dysplasia. Thorax. May 2013;68(5):475-84. doi: 10.1136/thoraxjnl-2012-202323. Epub Dec. 4, 2012.
Sdrimas et al., MSC microvesicles for the treatment of lung disease: a new paradigm for cell-free therapy. Antioxid Redox Signal. Nov. 1, 2014;21(13):1905-15. doi: 10.1089/ars.2013.5784. Epub Feb. 24, 2014.
Siza, Risk factors associated with low birth weight of neonates among pregnant women attending a referral hospital in northern Tanzania. Tanzanian Journal of Health Research. 2008;10(1):1-8.
Wang et al., Mesenchymal stem cells in the Wharton's jelly of the human umbilical cord. Stem Cells. 2004;22(7):1330-7.
Willis et al., Mesenchymal Stem Cell Exosome Treatment Restores Lung Architecture and Ameliorates Pulmonary Hypertension Asso-

(56) References Cited

OTHER PUBLICATIONS ciated with Bronchopulmonary Dysplasia. Database Biosis. Accession No. PRE201700750539: Experimental Biology Meeting. Apr. 2017;31(1): 327.5.
Willis et al., Mesenchymal stem cell exosome treatment restores lung architecture and ameliorates pulmonary hypertension associated with bronchopulmonary dysplasia. American Thoracic Society 2017 International Conference. May 23, 2017;1:1-4.
Xin et al., Exosome-mediated transfer of miR-133b from multipotent mesenchymal stromal cells to neural cells contributes to neurite outgrowth. Stem Cells. Jul. 2012;30(7):1556-64. doi: 10.1002/stem.1129. Author Manuscript, 20 pages.
Yahyapour et al., Radiation-induced inflammation and autoimmune diseases. Mil Med Res. Mar. 20, 2018;5(1):9. doi: 10.1186/s40779-018-0156-7.
Yang et al., Research progress on exosomes derived from mesenchymal stem cells. Military Medical Journal of South China. Feb. 28, 2018;2:1-32.
Zhang et al., Mesenchymal stem cells secrete immunologically active exosomes. Stem Cells Dev. Jun. 1, 2014;23(11):1233-44. doi: 10.1089/scd.2013.0479. Epub Feb. 10, 2014.
Zhang et al., Progress on exosome and effect on regulatory T cells. Chinese Journal of Immunology. Mar. 20, 2018;3:1-32.
Zhang et al., Role of bone marrow-derived mesenchymal stem cells in the prevention of hyperoxia-induced lung injury in newborn mice. Cell Biol Int. Jun. 1, 2012;36(6):589-94. doi: 10.1042/CBI20110447.
Zhang et al., Therapeutic benefit of mesenchymal stem cells in pregnant rats with angiotensin receptor agonistic autoantibody-induced hypertension: Implications for immunomodulation and cytoprotection. Hypertens Pregnancy. Aug. 2017;36(3):247-258. doi: 10.1080/10641955.2017.1329429. Epub Jun. 13, 2017.
Zhao et al., Intravenous injection of mesenchymal stem cells is effective in treating liver fibrosis. World J Gastroenterol. 2012; 18(10): 1048-1058. DOI: 10.3748/wjg.v18.i10.1048.
U.S. Appl. No. 15/867,816, filed Aug. 9, 2018, Mitsialis et al.
U.S. Appl. No. 16/814,044, filed Mar. 10, 2020, Mitsialis et al.
U.S. Appl. No. 16/639,474, filed Feb. 14, 2020, Mitsialis et al.
U.S. Appl. No. 17/053,752, filed Nov. 6, 2020, Mitsialis et al.
U.S. Appl. No. 17/273,684, filed Mar. 4, 2021, Mitsialis et al.
Ambalavan., Brochopulmonary Dysplasia, Overview. Medscape Online. UpdatedMar. 24, 2014. https://reference.medscape.com/article/973717-overview.
Aslam et al., Bone marrow stromal cells attenuate lung injury in a murine model of neonatal chronic lung disease. Am J Respir Crit Care Med. Dec. 1, 2009;180(11):1122-30. Epub Aug. 27, 2009.
Bobrie et al. Diverse subpopulations of vesicles secreted by different intracellular mechanisms are present in exosome preparations obtained by differential ultracentrifugation. J Extracell Vesicles. Apr. 16, 2012;1. doi: 10.3402/jev.v1i0.18397. eCollection 2012.
Bonfield et al., Adult mesenchymal stem cells: an innovative therapeutic for lung diseases. Discov Med. Apr. 2010;9(47):337-45. Retrieved from the internet May 25, 2012.
viahttp://www.discoverymedicine/com/Tracey-L-Bonfield/2010/04/15/adult-mesenchymal-stem-cells-an-innovative-therapeutic-for-lung-diseases/
Bruno et al., Mesenchymal stem cell-derived microvesicles protect against acute tubular injury. J Am Soc Nephrol. May 2009;20(5):1053-67. doi: 10.1681/ASN.2008070798. Epub Apr. 23, 2009.
Choi et al., Proteomic analysis of microvesicles derived from human colorectal cancer ascites.Proteomics. Jul. 2011;11(13):2745-51. doi: 10.1002/pmic.201100022. Epub Jun. 1, 2011.
Collino et al., Exosome and Microvesicle-Enriched Fractions Isolated from Mesenchymal Stem Cells by Gradient Separation Showed Different Molecular Signatures and Functions on Renal Tubular Epithelial Cells. Stem Cell Rev. Apr. 2017;13(2):226-243. doi: 10.1007/s12015-016-9713-1.
Donnarumma et al., Cancer-associated fibroblasts release exosomal microRNAs that dictate an aggressive phenotype in breast cancer. Oncotarget. Mar. 21, 2017;8(12):19592-19608.
Edgar, Q&A: What are exosomes, exactly? BMC Biology, 2016; vol. 14(46):1-7. doi: 10.1186/s12915-016-0268-z.
Fuchi et al., Feasibility of placenta-derived mesenchymal stem cells as a tool for studying pregnancy-related disorders. Sci Rep. Apr. 12, 2017;7:46220.
Gallo et al., The majority of microRNAs detectable in serum and saliva is concentrated in exosomes. PLoS One. 2012;7(3):e30679. doi: 10.1371/journal.pone.0030679. Epub Mar. 9, 2012.
Genneback et al., Growth factor stimulation of cardiomyocytes induces changes in the transcriptional contents of secreted exosomes. J Extracell Vesicles. May 17, 2013;2:10.3402.
Gotts et al., Mesenchymal stem cells and acute lung injury. Crit Care Clin. Jul. 2011;27(3):719-33. Epub May 23, 2011.
Gupta et al., Intrapulmonary delivery of bone marrow-derived mesenchymal stem cells improves survival and attenuates endotoxin-induced acute lung injury in mice. J Immunol. Aug. 1, 2007;179(3):1855-63.
Huang et al., Exosomes derived from human adipose mesenchymal stem cells improve ovary function of premature ovarian insufficiency by targeting SMAD. Stem Cell Res Ther. Aug. 9, 2018;9(1):216.
Ji et al., Proteome profiling of exosomes derived from human primary and metastatic colorectal cancer cells reveal differential expression of key metastatic factors and signal transduction components. Proteomics. May 2013;13(10-11):1672-86. doi: 10.1002/pmic.201200562.
Jørgensen et al., Extracellular Vesicle (EV) Array: microarray capturing of exosomes and other extracellular vesicles for multiplexed phenotyping. J Extracell Vesicles. Jun. 18, 2013;2. doi: 10.3402/jev.v210.20920. eCollection 2013.
Kalra et al., Comparative proteomics evaluation of plasma exosome isolation techniques and assessment of the stability of exosomes in normal human blood plasma. Proteomics. Nov. 2013;13(22):3354-64. doi: 10.1002/pmic.201300282. Epub Oct. 18, 2013.
Katsha et al., Paracrine factors of multipotent stromal cells ameliorate lung injury in an elastase- induced emphysema model. Mol Ther. Jan. 2011;19(1):196-203. Epub Sep. 14, 2010.
Lai et al., Exosome secreted by MSC reduces myocardial ischemia/reperfusion injury. Stem Cell Res. May 2010;4(3):214-22. doi: 10.1016/j.scr.2009.12.003. Epub Jan. 4, 2010.
Lee et al., Exosomes mediate the cytoprotective action of mesenchymal stromal cells on hypoxia-induced pulmonary hypertension. Circulation. Nov. 27, 2012;126(22):2601-11.
Lee et al., Exosomes Mediate the Cytoprotective Effects of Bone Marrow-Derived Stromal Cells (MSCs) on the Hypoxic Lung. American Thoracic Society International Conference Abstracts. May 13-18, 2011. Abstract 21620.
Lee et al., Intravenous hMSCs improve myocardial infarction in mice because cells embolized in lung are activated to secrete the anti-inflammatory protein TSG-6. Cell Stem Cell. Jul. 2, 2009;5(1):54-63. doi: 10.1016/j.stem.2009.05.003.
Long et al., Intranasal MSC-derived A1-exosomes ease inflammation, and prevent abnormal neurogenesis and memory dysfunction after status epilepticus. Proc Natl Acad Sci U S A. Apr. 25, 2017;114(17):E3536-E3545. doi: 10.1073/pnas.1703920114.
Lopez-Rodriguez., Immunosuppressive properties of Wharton's jelly derived mesenchymal stromal cells in the treatment of graft versus host disease in rat model. Thesis. Kansas State University. Aug. 1, 2013. pp. 1-20 only. Retrieved on Jul. 9, 2019 from https:krex.k-state.edu/dspace/handle/2097/16331.
Lou et al., Mesenchymal stem cell-derived exosomes as a new therapeutic strategy for liver diseases. Exp Mol Med. Jun. 16, 2017;49(6):e346. doi: 10.1038/emm.2017.63.
Mathivanan et al., Exosomes: extracellular organelles important in intercellular communication. J Proteomics. Sep. 10, 2010;73(10):1907-20. doi: 10.1016/j.jprot.2010.06.006. Epub Jul. 1, 2010.
Matthay et al., Concise review: Mesenchymal stem (stromal) cells: Biology and preclinical evidence for therapeutic potential for organ dysfunction following trauma or sepsis. Stem Cells. Feb. 17, 2017: 35(2);316-324.
Matthay et al., Mesenchymal stem cells for acute lung injury: preclinical evidence. Crit Care Med. Oct. 2010;38(10 Suppl):S569-73.

(56) References Cited

OTHER PUBLICATIONS

Mei et al., Prevention of LPS-induced acute lung injury in mice by mesenchymal stem cells overexpressing angiopoietin 1. PLoS Med. Sep. 2007;4(9):e269, pp. 1525-1537.
Musina et al., Comparison of mesenchymal stem cells obtained from different human tissues. Bull Exp Biol Med. Apr. 2005;139(4):504-9.
Ophelders et al., Mesenchymal Stromal Cell-Derived Extracellular Vesicles Protect the Fetal Brain After Hypoxia-Ischemia. Stem Cells Transl Med. Jun. 2016;5(6):754-63.
Ortiz et al., Mesenchymal stem cell engraftment in lung is enhanced in response to bleomycin exposure and ameliorates its fibrotic effects. Proc Natl Acad Sci U S A. Jul. 8, 2003;100(14):8407-11. Epub Jun. 18, 2003.
Paine et al., Dentin sialoprotein and dentin phosphoprotein overexpression during amelogenesis. J Biol Chem. Sep. 9, 2005;280(36):31991-8. Epub Jul. 13, 2005.
Patel et al., Mesenchymal stem cells attenuate hypoxic pulmonary vasoconstriction by a paracrine mechanism. J Surg Res. Dec. 2007;143(2):281-5. Epub Sep. 14, 2007.
Rojas et al., Bone marrow-derived mesenchymal stem cells in repair of the injured lung. Am J Respir Cell Mol Biol. Aug. 2005;33(2):145-52. Epub May 12, 2005.
Simpson et al., Exosomes: proteomic insights and diagnostic potential. Expert Rev Proteomics. Jun. 2009;6(3):267-83. doi: 10.1586/epr.09.17.
Spees et al., Bone marrow progenitor cells contribute to repair and remodeling of the lung and heart in a rat model of progressive pulmonary hypertension. FASEB J. Apr. 2008;22(4):1226-36.
Strauss et al., Exosome secretion ameliorates lysosomal storage of cholesterol in Niemann-Pick type C disease. J Biol Chem. Aug. 20, 2010;285(34):26279-88. doi: 10.1074/jbc.M110.134775. Epub Jun. 16, 2010.
Tannetta et al., Characterization of syncytiotrophoblast vesicles in normal pregnancy and pre-eclampsia: expression of Flt-1 and endoglin. PLoS One. 2013;8(2):e56754. doi: 10.1371/journal.pone.0056754.
Tauro et al., Oncogenic H-ras reprograms Madin-Darby canine kidney (MDCK) cell-derived exosomal proteins following epithelial-mesenchymal transition. Mol Cell Proteomics. Aug. 2013;12(8):2148-59. doi: 10.1074/mcp.M112.027086. Epub May 3, 2013.
Van Haaften et al., Airway delivery of mesenchymal stem cells prevents arrested alveolar growth in neonatal lung injury in rats. Am J Respir Crit Care Med. Dec. 1, 2009;180(11):1131-42. Epub Aug. 27, 2009.
Weiss et al., Embryonic stem cells and repair of lung injury. Mol Ther. Mar. 2010;18(3):460-1.
Willis et al., Mesenchymal Stromal Cell Exosomes Ameliorate Experimental Bronchopulmonary Dysplasia and Restore Lung Function through Macrophage Immunomodulation. Am J Respir Crit Care Med. Jan. 1, 2018;197(1):104-116.
Xiong et al., Protective effect of human umbilical cord mesenchymal stem cell exosomes on preserving the morphology and angiogenesis of placenta in rats with preeclampsia. Biomed Pharmacother. Sep. 2018;105:1240-1247.
Xu et al., Prevention of endotoxin-induced systemic response by bone marrow-derived mesenchymal stem cells in mice. Am J Physiol Lung Cell Mol Physiol. Jul. 2007;293(1):L131-41. Epub Apr. 6, 2007.
EP 19800074.7, Jan. 7, 2022, Extended European Search Report.
PCT/US2019/029275, Aug. 20, 2019, International Search Report and Written Opinion.
PCT/US2019/029275, Nov. 12, 2020, International Preliminary Report on Patentability.
Bursi et al., Chronic obstructive pulmonary disease after myocardial infarction in the community. Am Heart J. Jul. 2010;160(1):95-101. doi: 10.1016/j.ahj.2010.05.004.
Nakamura et al., Altered expression of CD63 and exosomes in scleroderma dermal fibroblasts. J Dermatol Sci. Oct. 2016;84(1):30-39. doi: 10.1016/j.jdermsci.2016.06.013. Epub Jul. 1, 2016.
Nichols Characterization of a new human diploid cell strain, IMR-90. Science. Apr. 1, 1977;196(4285):60-3. doi: 10.1126/science.841339.
Rani et al., Mesenchymal Stem Cell-derived Extracellular Vesicles: Toward Cell-free Therapeutic Applications. Mol Ther. May 2015;23(5):812-823. doi: 10.1038/mt.2015.44. Epub Mar. 19, 2015.
Azizi et al., Stem cell therapy in Asherman syndrome and thin endometrium: Stem cell- based therapy. Biomed Pharmacother. Jun. 2018;102:333-343. doi: 10.1016/j.biopha.2018.03.091. Epub Mar. 22, 2018.
Chau et al., Progress in preeclampsia: the contribution of animal models. J Hum Hypertens. Aug. 2022;36(8):705-710. doi: 10.1038/s41371-021-00637-x. Epub Nov. 26, 2021.
Huang et al., Exosomes derived from human adipose mesenchymal stem cells improve ovary function of premature ovarian insufficiency by targeting SMAD. Stem Cell Res Ther. Aug. 9, 2018;9(1):216. doi: 10.1186/s13287-018-0953-7.
Maggini et al., Mouse bone marrow-derived mesenchymal stromal cells turn activated macrophages into a regulatory-like profile. PLoS One. Feb. 16, 2010;5(2):e9252. doi: 10.1371/journal.pone.0009252.
Møller et al., Prognostic importance of secondary pulmonary hypertension after acute myocardial infarction. Am J Cardiol. Jul. 15, 2005;96(2):199-203. doi: 10.1016/j.amjcard.2005.03.043.
Vinayagam et al., Preeclam[sia-What is to blame? The placenta, maternal cardiovascular system or both ?. Wolrd J. of Obs. and Gyn. Nov. 10, 2015; 4(4):77-85. doi: 10.5317/wjog.v4.i4.77.

* cited by examiner

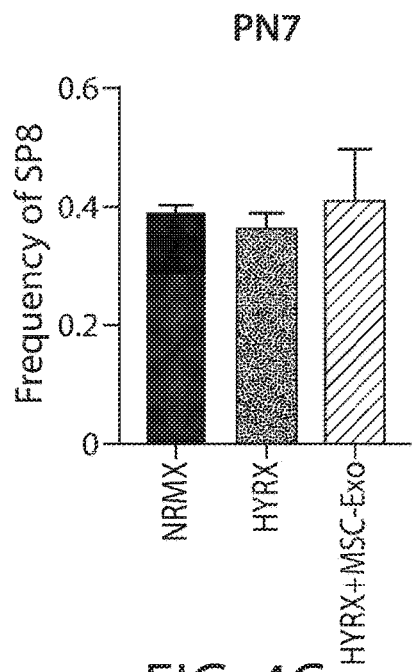
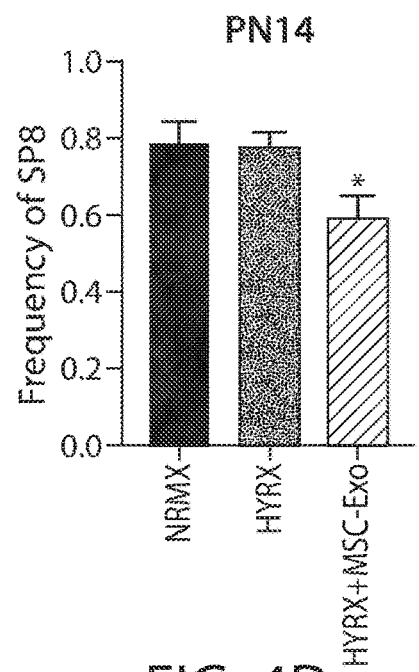
FIG. 4C
FIG. 4D
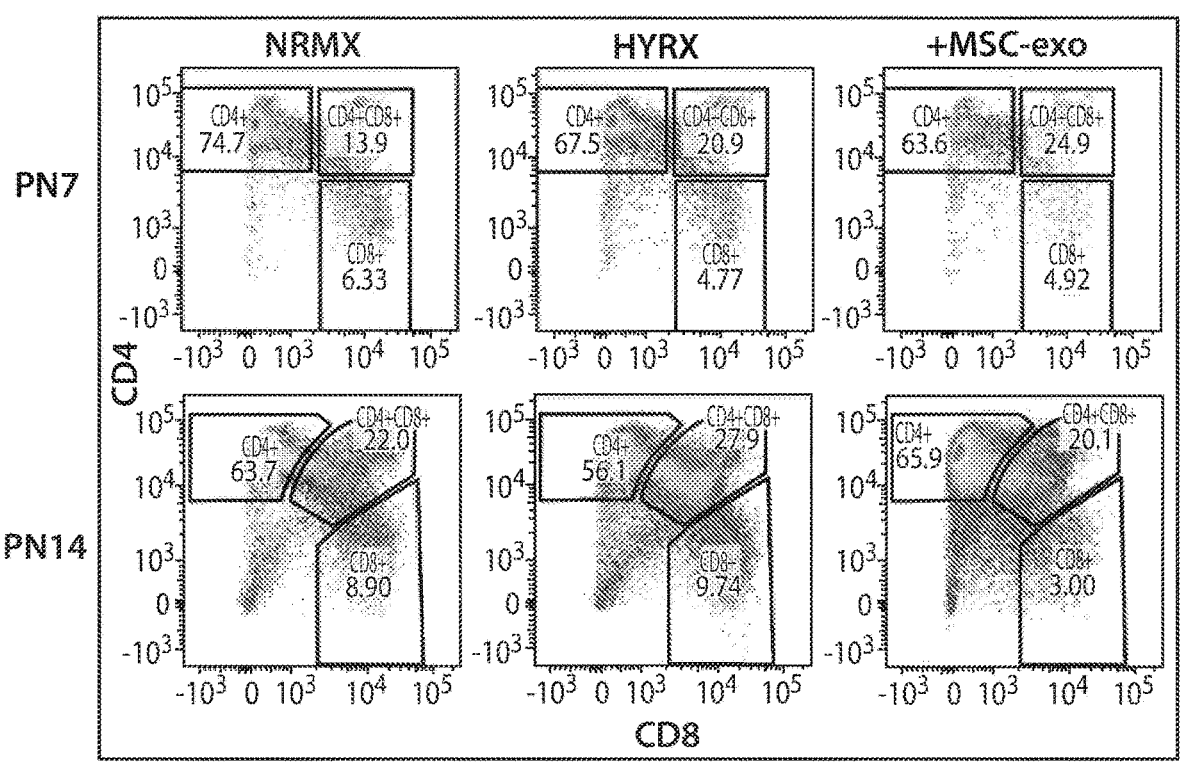
FIG. 4E

MESENCHYMAL STROMAL CELL EXOSOMES AND USES THEREOF

RELATED APPLICATIONS

This application is a National Stage filing under 35 U.S.C. § 371 of International Application No. PCT/US2019/029275, filed Apr. 26, 2019, which claims the benefit under 35 U.S.C. § 119 (e) to U.S. Provisional Application No. 62/664,696, filed Apr. 30, 2018, and entitled "MESENCHYMAL STORMAL CELL EXOSOMES AND USES THEREOF," the entire contents of each of which are incorporated herein by reference.

BACKGROUND

The therapeutic capacity of mesenchymal stem/stromal cells (MSCs) in different organs has been described. Beneficial properties of MSC exosome treatment have also been reported in a number of disease models, including myocardial infarction, kidney injury, and neurological conditions.

SUMMARY

The present disclosure, in some aspects, describe the therapeutic effects of MSC exosomes in treating thymic dysfunction. In some embodiments, the subject is an infant or a neonate (e.g., human infant or neonate). Methods of treating diseases associated with thymus dysfunction are also provided.

Some aspects of the present disclosure provide methods of treating a disease associated with thymic dysfunction, the method comprising administering to a subject in need thereof an effective amount of a mesenchymal stem cell (MSC) exosome.

In some embodiments, the isolated MSC exosome is isolated from MSC-conditioned media. In some embodiments, the MSC is from Warton's Jelly or bone marrow.

In some embodiments, the subject is a human subject. In some embodiments, the human subject is a neonate, an infant, or an adult. In some embodiments, the human subject is less than four weeks of age. In some embodiments, the human subject is four weeks to 3 years of age. In some embodiments, the human subject is 3-18 years of age. In some embodiments, the human subject is an adult.

In some embodiments, the human subject is born prematurely. In some embodiments, the human subject was born before 37 weeks of gestation. In some embodiments, the human subject was born before 26 weeks of gestation.

In some embodiments, the human subject was stressed at birth. In some embodiments, the subject has been administered oxygen or has been on a ventilator. In some embodiments, the subject has oxygen-induced thymic involution. In some embodiments, the subject has impaired innate and/or adaptive immunity.

In some embodiments, the MSC exosome is administered immediately after birth. In some embodiments, the MSC exosome is administered within an hour of birth. In some embodiments, the isolated MSC exosome is administered within one month of birth. In some embodiments, the isolated MSC exosome is administered intravenously.

In some embodiments, the MSC exosome restores thymic architecture. In some embodiments, the MCS exosomes increases thymocyte counts. In some embodiments, the MSC exosome reduces thymocyte apoptosis. In some embodiments, the MSC exosome promotes maturation of medullary thymic epithelial cells. In some embodiments, the MSC exosome restores thymocyte progenitor population in the thymus.

In some embodiments, the disease associated with thymic dysfunction is an immune disorder. In some embodiments, the immune disorder is selected from the group consisting of: autoimmune disease, neonatal lupus, rheumatoid arthritis, and type I diabetes. In some embodiments, the disease associated with thymic dysfunction is infection, congenital heart disease especially in the setting of DiGeorge's syndrome, post cardiac surgery where thymectomy is performed to access the heart for surgical repair, birth trauma, or hypoxic-ischemic encephalopathy (HIE).

In some embodiments, the subject is a rodent. In some embodiments, the rodent is a mouse or rat. In some embodiments, the subject is a companion animal.

Also provided herein is the use of a mesenchymal stem cell (MSC) exosome to treat a disease associated with thymic dysfunction in a subject in need thereof.

The summary above is meant to illustrate, in a non-limiting manner, some of the embodiments, advantages, features, and uses of the technology disclosed herein. Other embodiments, advantages, features, and uses of the technology disclosed herein will be apparent from the Detailed Description, the Drawings, the Examples, and the Claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

(FIG. 1A) Newborn FVB mice were exposed to HYRX (75% O2) for 7 days. HYRX-exposed mice were treated with MSC-exosomes intravenously (IV) at PN4. Outcomes of treated and non-treated HYRX-mice were compared to mice that remained at NRMX (room air). Harvested thymi sections were stained for hematoxylin & eosin (H&E) at PN14. (FIG. 1B) Thymic architecture of mice subjected to NRMX (left), HYRX (middle) and HYRX+MSC-exo (right) was assessed by measurements of whole cortical and medullary areas (micrographs with magnification 4×). (FIG. 1C) Thymic architecture of HYRX group displayed an involution of the medullary area of the thymus, which translates into an increased cortico-medullary ratio, compared to NRMX controls. MSC-exosome treatment restored thymic architecture, as evidenced by cortico-medullary ratios similar to NRMX control levels. (FIG. 1D) Thymocytes number was determined by flow cytometric analysis using Countbright Beads. HYRX group exhibits a loss of thymocytes compared to NRMX levels. The number of thymocytes was restored to NRMX levels with MSC-exosome treatment. Data represent results from 2 individual studies. Mean±SEM of n=4-10 and *p<0.05.

(FIG. 2A) Representative graphs of thymocytes from mice subjected to NRMX (left), HYRX (middle) and HYRX+MSC-exosomes (right) display the differences in the overall percentage of apoptotic cells in each group at PN14. (FIG. 2B) HYRX thymocytes displayed higher apoptotic levels compared to NRMX-derived thymocytes (50.74%±1.74 vs 27.24%±1.64, respectively). MSC-exosome treatment induced a reduction in apoptotic levels of thymocytes (44.4%±1.74), despite not reaching NRMX control levels. (FIG. 2C) Representative micrographs of AIRE (autoimmune regulator transcription factor) expression in thymic medulla of NRMX, HYRX and HYRX+MSC-Exo groups. HYRX induced a reduction in AIRE expression in thymic medullary area, compared to NRMX control. MSC-exosome treatment restored medullary expression of AIRE. (FIG. 2D) Cumulative data of AIRE expression in NRMX, HYRX and HYRX+MSC-exo groups. Data represent results from 2 individual studies. Mean±SEM of n=4-8 and *p<0.05, ***p<0.001.

(FIG. 3A) Schematic representation of the phenotype of the T cell developmental stages in the thymus. Migratory thymocyte progenitors that migrate from the Bone Marrow are $CD44^+$ $CD25^-$ and negative for the expression of CD4 and CD8 T cell markers. Throughout thymocyte development, the progenitors lose the expression of CD44 and gain the expression of CD25 (DN stages 1-3). At this stage, thymocytes undergo positive selection in the thymic cortical area and start expressing CD4 and CD8 (DP). These thymocytes migrate to the medullary area of the thymus where they interact with antigen presenting cells (monocytes, dendritic cells, macrophages and AIRE expressing TECs) where they undergo negative selection (eradication of autoreactive T cells) into either naïve $CD4^+$ (SP4) and $CD8^+$ (SP8) T cells, which will then migrate out of the thymus. (FIG. 3B) Flow cytometric analysis of thymocytes at PN7 shows a decrease in the proportion of double negative progenitors in the HYRX thymi, compared to NRMX (9.14%±0.97 vs 11.7%±1.06, respectively). MSC-exosome restored the proportion of double negative progenitors to control levels (13.8%±1.03). Results represent the sum of the proportions of DN1, DN2 and DN3 as acquired by flow cytometry. (FIG. 3C) No differences were in the proportion of double negative progenitors at PN14. (FIG. 3D) Representative flow cytometric graphs of double negative progenitor analysis using CD44 and CD25 expression. Data represent results from 2 individual studies. Mean±SEM of n=4-10 and *p<0.05 and **p<0.01.

FIGS. 4A-4G. MSC-Exosome treatment promotes the development of $CD4^+$ T cells in the thymus but inhibits the development of $CD8^+$ T cells. Thymocytes were analyzed for the expression of CD4 and CD8. No differences were detected in the proportion of the double positive populations (not shown). Analysis of single positive cells (SP4=$CD4^+$ $CD8^-$ and SP8=$CD8^+CD4^-$) showed no differences in the overall proportion of SP4 amongst the three analyzed groups at PN7 (FIG. 4A) and PN14 (FIG. 4B). However, despite no changes being detected in SP8 population at PN7 (FIG. 4C), there was a significant decrease of SP8 population after MSC-exosome treatment at PN14 (FIG. 4D). (FIG. 4E) Representative flow cytometric graphs show the differences in the proportions of SP4, SP8 and DP cells in the thymus at PN7 and PN14. No changes in the CD4/CD8 ratio were detected amongst the three analyzed groups at PN7 (FIG. 4F). However, MSC-exosome treatment induced high thymic CD4/CD8 ratios due to the loss of the CD8+ population at PN14 (FIG. 4G). Data represent results from 2 individual studies. Mean±SEM of n=4-12 and *p<0.05.

FIG. 5A shows that the thymus of hyperoxia-exposed mice present lower thymocyte counts compared to the normoxia group and MEx-treated groups. FIG. 5B shows representative TUNEL staining micrographs and FIG. 5C illustrates the number of apoptotic cells/$mm^2$, which shows that mice exposed to hyperoxia exhibit increased levels of TUNEL cells which are restored to normoxic levels upon MEx treatment. Representative micrographs were taken at a magnification of 600× and scale bar represents 20 µm. Data are shown as mean±SEM of n≥6. *P≤0.05, ****P≤0.0001.

FIG. 6A is a schematic showing the role of thymic medullary area. After undergoing positive selection in the cortical area of the thymus, T cell progenitors expressing either CD4 or CD8 (SPs) migrate to the medullary area where they interact with medullary thymic epithelial cells (mTECs) and dendritic cells ($CD11c^+$ DC). In the medulla, mTECs express the autoimmune regulator (AIRE) which leads to the expression of a plethora of tissue restricted self-antigens (TRAs). $AIRE^+$ mTECs directly interact with SPs or tightly collaborate with $CD11c^+$ DCs to delete autoreactive T cells and induce the generation of naïve regulatory T cells. To assess the effect of hyperoxia and MEx treatment on these two subsets of medullary cells, thymi sections of mice harvested at postnatal day 14 were stained with AIRE and CD11c. MEx treatment restores AIRE expression in mTECs (FIG. 6B) and restore the $CD11c^+$ DC phenotype (FIG. 6C) in the medullary area of mice exposed to hyperoxia. Representative immunofluorescence staining and cumulative mean fluorescence intensity are shown in FIGS. 6B and 6C. Arrows highlight CD11c stained DCs. Representative micrographs were taken at a magnification of 400× (FIG. 6B) and 600× (FIG. 6C) and scale bars =50 µm. Data are shown as mean ±SEM of n≥6. *P≤0.05, P≤0.01, **P≤0.0001.

FIGS. 7A-7B show representative graphs (FIG. 7A) and cumulative data (FIG. 7B) of CD25 and FoxP3 expression within the thymic $CD4^+CD25^+$ single positive T cell population indicate that MEx treatment in mice exposed to hyperoxia restores the regulatory T cell phenotype to levels akin to normoxia. FIGS. 7C-7D show representative graphs (FIG. 7C) and cumulative data (FIG. 7D) of CD25 and FoxP3 expression within the $CD3^+CD4^+$ T cell gate show that MEx induces a regulatory phenotype in CD4 T cells in the spleen and lungs of mice exposed to hyperoxia. Data are shown as mean±SEM of n≥5. *P≤0.05, P≤0.01, *P≤0.001.

DETAILED DESCRIPTION OF CERTAIN EMBODIMENTS

Figure 1A:
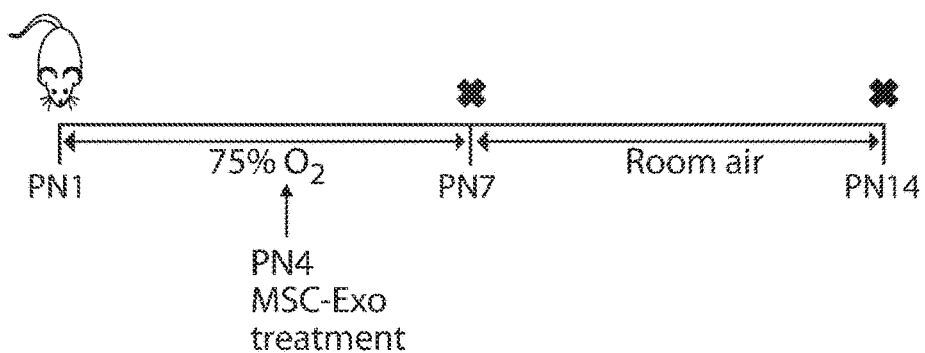
FIGs. 1A to 1D. MSC-Exosomes restored thymic architecture and thymocyte counts to control levels.
Figure 1B:
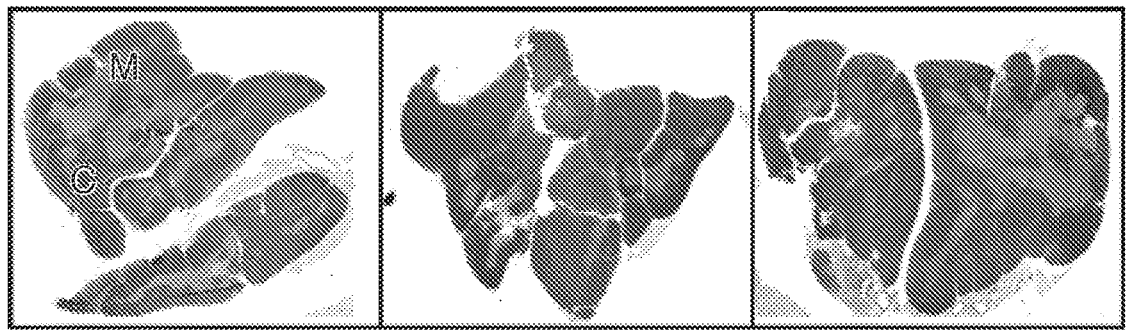
Figure 1C:
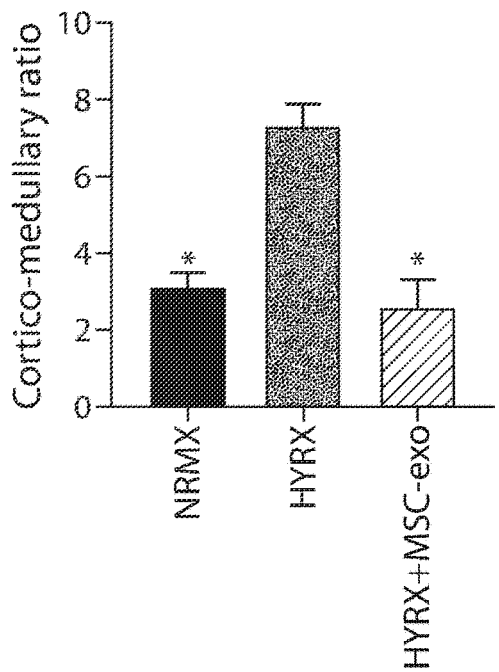
Figure 1D:
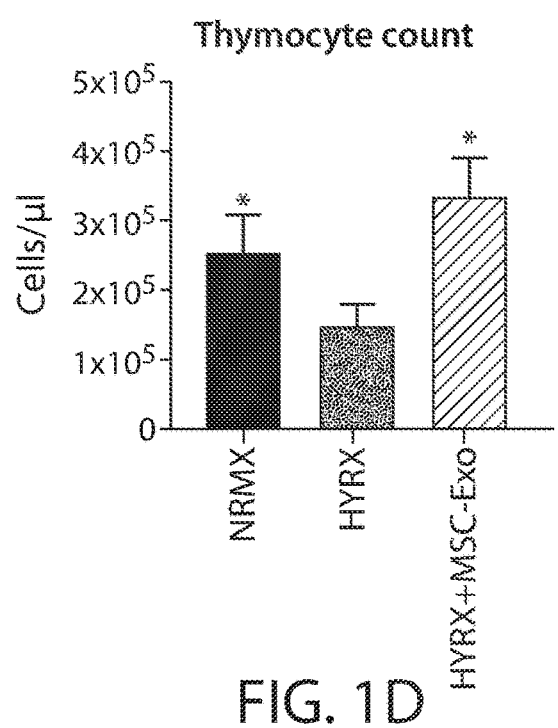

Oxygen induced injuries can cause a wide range of diseases. In newborns (e.g., infants or neonates) requiring oxygen supplementation, oxygen injury causes restricted lung growth and alveolar and blood vessel development, resulting in impaired pulmonary function. It has been previously shown that mesenchymal stem cell (MSC) exosomes can be used to treat lung diseases, including impairment of lung function induced by hyperoxia (e.g., as described in Willis et al., American journal of respiratory and critical care medicine, doi:10.1164/rccm.201705-0925OC (2017), incorporated herein by reference). MSC exosomes can significantly improve lung morphology, reduced lung fibrosis and promoted vascular remodeling in an experimental model of neonatal hyperoxia. These effects were mainly via inhibition of hyperoxia-induced inflammation, through modulation of macrophage phenotype in the lung[1].

The effect of prolonged hyperoxia on the thymus, an essential organ for the development of adaptive immune cells, remains unexplored. In the neonates, the adaptive immune system is relatively underdeveloped. The present disclosure, in some aspects, assesses the effect of hyperoxia on thymic architecture and function, especially in neonates, whose adaptive immune system is relatively underdeveloped. The thymic microenvironment is a three-dimensional cellular architecture composed of a set thymic epithelial cells (TECs), which guide the development and repertoire of T cells[2]. As described herein, in experimental models of neonatal hyperoxia, the thymus was shown to involute and to promote the maturation of autoreactive T cells. Oxygen-induced thymic involution was shown to be due to increased thymocyte apoptosis which induced a significant reduction in count and proliferation of double positive and double negative thymocytes[3,4]. Further provided herein are the therapeutic effects of MSC exosomes on the dysfunctional thymus, which has not been previously explored. The MSC exosomes restored thymic architecture and function, reduced apoptosis of thymocytes, and promoted normal maturation of medullary TECs.

Accordingly, some aspects of the present disclosure provide methods of treating a disease associated with thymic dysfunction, the method comprising administering to a subject in need thereof an effective amount of a mesenchymal stem cell (MSC) exosome. The thymus is a lymphoid organ situated in the neck of vertebrates that produces T cells for the immune system.

The thymus is a specialized primary lymphoid organ of the immune system. T cells mature within the thymus. T cells are critical to the adaptive immune system, where the body adapts specifically to foreign invaders. The thymus is composed of two identical lobes and is located anatomically in the anterior superior mediastinum, in front of the heart and behind the sternum. Histologically, each lobe of the thymus can be divided into a central medulla and a peripheral cortex which is surrounded by an outer capsule. The cortex and medulla play different roles in the development of T cells. Cells in the thymus can be divided into thymic stromal cells and cells of hematopoietic origin (derived from bone marrow resident hematopoietic stem cells). Developing T cells are referred to as thymocytes and are of hematopoietic origin. Stromal cells include epithelial cells of the thymic cortex and medulla, and dendritic cells.

The thymus provides an inductive environment for development of T cells from hematopoietic progenitor cells. In addition, thymic stromal cells allow for the selection of a functional and self-tolerant T cell repertoire. Therefore, one of the most important roles of the thymus is the induction of central tolerance. The thymus is largest and most active during the neonatal and pre-adolescent periods. By the early teens, the thymus begins to atrophy and thymic stroma is mostly replaced by adipose (fat) tissue. Nevertheless, residual T lymphopoiesis continues throughout adult life.

"Thymic dysfunction," as used herein, refers to the impairment in thymus architecture and function in the subject to be treated. In some embodiments, thymic dysfunction is a dysfunction in thymic microenvironment, including but not limited to defects of thymic epithelial cells (TECs) and dendritic cells, defects in T cell development, and thymic involution. Without wishing to be bound by scientific theory, one of the major biological functions of the thymus is generating diverse repertoire of T cells for the development of adaptive immunity and keep balance between host immunity and self-tolerance. Thus, in some embodiments, thymic dysfunction encompasses dysfunction in a subject's adaptive immune system and/or self-tolerance establishment.

Thymic dysfunction may be caused by various reasons. In some embodiments, the subject having thymic dysfunction was stressed at birth. Factors that cause a subject to be stressed at birth include, without limitation: premature birth, intrauterine growth restriction (IUGR), chorioamnionitis, infection, respiratory distress, cardiac disease, hypoxic ischemic encephalopathy (HIE), placental blood loss or any neonatal conditions requiring intensive care treatment and separation from the mother. For example, the subject may be born prematurely. In some embodiments, the subject has been administered oxygen or has been on a ventilator (e.g., as required by the treatment of any condition the subject may have). In some embodiments, the subject has oxygen-induced thymic involution. Exposure to hyperoxia condition can cause oxygen-induced thymic involution, which is the progressive shrinking of the thymus. Thymic involution is typically associated with the decline of the development of T cells (e.g., naïve T cells), the impairment of immunological tolerance and the decline of the immune system.

In some embodiments, a subject that has thymic dysfunction has a thymus of reduced size, compared to a subject that does not have thymic dysfunction (e.g., a healthy subject). For example, a subject that has thymic dysfunction may have a thymus whose size is reduced by at least 20%, at least 30%, at least 40%, at least 50%, at least 60%, at least 70%, at least 80%, at least 90%, or 100%, compared to a subject that does not have thymic dysfunction (e.g., a healthy subject). In some embodiments, a subject that has thymic dysfunction has a thymus whose size is reduced by 20%, 30%, 40%, 50%, 60%, 70%, 80%, 90%, or 100%, compared to a subject that does not have thymic dysfunction (e.g., a healthy subject).

In some embodiments, a subject that has thymic dysfunction has a reduced number (e.g., by at least 20%) of thymocytes, compared to a subject that does not have thymic dysfunction (e.g., a healthy subject). For example, a subject that has thymic dysfunction may have a number of thymocytes that is reduced by at least 20%, at least 30%, at least 40%, at least 50%, at least 60%, at least 70%, at least 80%, at least 90%, or 100%, compared to a subject that does not have thymic dysfunction (e.g., a healthy subject). In some embodiments, a subject that has thymic dysfunction has a number of thymocytes that is reduced by 20%, 30%, 40%, 50%, 60%, 70%, 80%, 90%, or 100%, compared to a subject that does not have thymic dysfunction (e.g., a healthy subject). A "thymocyte" is a hematopoietic progenitor cells present in the thymus. The primary function of a thymocytes is the generation of T lymphocytes (T cells). Thymocytes are classified into a number of distinct maturational stages based on the expression of cell surface markers. The earliest thymocyte stage is the double negative stage (negative for both CD4 and CD8, also termed "thymocyte progenitor cells" herein), which more recently has been better described as Lineage-negative, and which can be divided into four sub stages. The next major stage is the double positive stage (positive for both CD4 and CD8). The final stage in maturation is the single positive stage (positive for either CD4 or CD8).

In some embodiments, a subject that has thymic dysfunction has a reduced number (e.g., by at least 20%) of thymocyte progenitor cells, compared to a subject that does not have thymic dysfunction (e.g., a healthy subject). For example, a subject that has thymic dysfunction may have a number of thymocyte progenitor cells that is reduced by at least 20%, at least 30%, at least 40%, at least 50%, at least 60%, at least 70%, at least 80%, at least 90%, or 100%, compared to a subject that does not have thymic dysfunction (e.g., a healthy subject). In some embodiments, a subject that has thymic dysfunction has a number of thymocyte progenitor cells that is reduced by 20%, 30%, 40%, 50%, 60%, 70%, 80%, 90%, or 100%, compared to a subject that does not have thymic dysfunction (e.g., a healthy subject).

In some embodiments, a subject that has thymic dysfunction develops a reduced number (e.g., by at least 20%) of CD4 and/or CD8 positive T cells, compared to a subject that does not have thymic dysfunction (e.g., a healthy subject). For example, a subject that has thymic dysfunction may develop a number of CD4 and/or CD8 positive T cells that is reduced by at least 20%, at least 30%, at least 40%, at least 50%, at least 60%, at least 70%, at least 80%, at least 90%, or 100%, compared to a subject that does not have thymic dysfunction (e.g., a healthy subject). In some embodiments, a subject that has thymic dysfunction develops a number of CD4 and/or CD8 positive T cells that is reduced by 20%, 30%, 40%, 50%, 60%, 70%, 80%, 90%, or 100%, compared to a subject that does not have thymic dysfunction (e.g., a healthy subject). In some embodiments, the subject who has thymic dysfunction has an abnormal ratio of CD4/CD8 T cells, compared to a subject that does not have thymic dysfunction (e.g., a healthy subject). In some embodiments, the subject who has thymic dysfunction has an impaired innate and/or adaptive immune system. For example, the subject who has thymic dysfunction may have an adaptive immune system that has reduced activity against invading pathogens (e.g., causing infection) or increased activity against self (e.g., causing autoimmune diseases).

In some embodiments, a subject that has thymic dysfunction has a reduced number (e.g., by at least 20%) of mature medullary thymic epithelial cells, compared to a subject that does not have thymic dysfunction (e.g., a healthy subject). For example, a subject that has thymic dysfunction may have a number of mature medullary thymic epithelial cells that is reduced by at least 20%, at least 30%, at least 40%, at least 50%, at least 60%, at least 70%, at least 80%, at least 90%, or 100%, compared to a subject that does not have thymic dysfunction (e.g., a healthy subject). In some embodiments, a subject that has thymic dysfunction has a number of mature medullary thymic epithelial cells that is reduced by 20%, 30%, 40%, 50%, 60%, 70%, 80%, 90%, or 100%, compared to a subject that does not have thymic dysfunction (e.g., a healthy subject).

In some embodiments, a subject that has thymic dysfunction has an increased (e.g., by at least 20%) thymocyte apoptosis, compared to a subject that does not have thymic dysfunction (e.g., a healthy subject). For example, the thymocyte apoptosis in a subject that has thymic dysfunction may be increased by at least 20%, at least 30%, at least 40%, at least 50%, at least 60%, at least 70%, at least 80%, at least 90%, at least 100%, at least 2-fold, at least 5-fold, at least 10 fold, at least 100-fold, at least 1000-fold, or more, compared to a subject that does not have thymic dysfunction (e.g., a healthy subject). In some embodiments, the thymocyte apoptosis in a subject that has thymic dysfunction is increased by 20%, 30%, 40%, 50%, 60%, 70%, 80%, 90%, 100%, 2-fold, 5-fold, 10-fold, 100-fold, 1000-fold, or more, compared to a subject that does not have thymic dysfunction (e.g., a healthy subject).

Thymic dysfunction is associated with many diseases including thymic tumors, infectious diseases, and immune disorders (e.g., as described in Sun et al., Biomed Res Int. 2014; 2014: 206929, incorporated herein by reference). A subject has thymic dysfunction has or is at risk of developing diseases associated with thymic dysfunction. In some embodiments, a subject that has thymic dysfunction has impaired innate and/or adaptive immunity, compared to a subject that does not have thymic dysfunction (e.g., a healthy subject).

In some embodiments, the disease associated with thymic dysfunction is an immune disorder. An "immune disorder" refers to a disorder that causes abnormally low activity of over activity of the immune system. In cases of immune system over activity, the body attacks and damages its own tissues (autoimmune diseases). Immune deficiency diseases decrease the body's ability to fight invaders, causing vulnerability to infections. In some embodiments, the immune disorder is selected from the group consisting of: autoimmune disease, neonatal lupus, rheumatoid arthritis, and type I diabetes. In some embodiments, the immune disorder is an autoimmune disease. Non-limiting examples of autoimmune diseases include: rheumatoid arthritis (RA), systemic lupus erythematosus (SLE), Myasthenia Gravis (MG), Graves Disease, Idiopathic Thrombocytopenia Purpura (ITP), Guillain-Barre Syndrome, autoimmune myocarditis, Membrane Glomerulonephritis, Type I or Type II diabetes, juvenile onset diabetes, multiple sclerosis, Reynaud's syndrome, autoimmune thyroiditis, gastritis, Celiac Disease, Vitiligo, Hepatitis, primary biliary cirrhosis, inflammatory bowel disease, spondyloarthropathies, experimental autoimmune encephalomyelitis, immune neutropenia, and immune responses associated with delayed hypersensitivity mediated by cytokines, T-lymphocytes typically found in tuberculosis, sarcoidosis, and polymyositis, polyarteritis, cutaneous vasculitis, pemphigus (e.g., pemphigus vulgaris, pemphigus foliaceus or paraneoplastic pemphigus), pemphigold, Goodpasture's syndrome, Kawasaki's disease, systemic sclerosis, anti-phospholipid syndrome, and Sjogren's syndrome.

In some embodiments, the disease associated with thymic dysfunction is infection (e.g., infection caused by pathogens such as bacteria, viruses, fungi, and other microorganisms). In some embodiments, the infection is caused by a bacterium. Exemplary, non-limiting bacterial taxa, species, and strains, suitable for use in some embodiments of this disclosure include: *Escherichia* spp., *Enterobacter* spp. (e.g., *Enterobacter cloacae*), *Salmonella* spp. (e.g., *Salmonella enteritidis, Salmonella typhi*), *Shigella* spp., *Pseudomonas* spp. (e.g., *Pseudomonas aeruginosa, Pseudomonas pachastrellae, Pseudomonas stutzeri*), *Moraxella* spp. (e.g., *Moraxella catarrhalis*), *Neisseria* spp. (e.g., *Neisseria gonorrhoeae, Neisseria meningitidis*), *Helicobacter* spp.,(e.g., *Helicobacter pylori*) *Stenotrophomonas* spp., *Vibrio* spp. (e.g., *Vibrio cholerae*), *Legionella* spp. (*Legionella pneumophila*), *Hemophilus* spp. (e.g., *Hemophilus influenzae*), *Klebsiella* spp. (e.g., *Klebsiella pneumoniae*), *Proteus* spp. (e.g., *Proteus mirabilis*), *Serratia* spp. (*Serratia marcescens*), *Streptococcus* spp., *Staphylococcus* spp., *Coryne-* bacterium spp., *Listeria* spp., and *Clostridium* spp.., *Bacillus* spp. (e.g., *Bacillus anthracis*) *Bordetella* spp. (e.g., *Bordetella pertussis*); *Borrelia* spp. (e.g., *Borrelia burgdorferi*); *Brucella* spp. (e.g., *Brucella abortus, Brucella canis, Brucella melitensis, Brucella suis*); *Campylobacter* spp. (e.g., *Campylobacter jejuni*); *Chlamydia* spp. and *Chlamydophila* spp. (e.g., *Chlamydia pneumoniae, Chlamydia trachomatis, Chlamydophila psittaci*); *Clostridium* spp. (e.g., *Clostridium botulinum, Clostridium difficile, Clostridium perfringens, Clostridium tetani*); *Corynebacterium* spp. (e.g., *Corynebacterium diphtheriae*); *Enterococcus* spp. (e.g., *Enterococcus faecalis, Enterococcus faecium*); *Escherichia* spp. (e.g., *Escherichia coli, Enterotoxic E. coli, enteropathogenic E. coli; E. coli* O157:H7); *Francisella* spp. (e.g., *Francisella tularensis*); *Haemophilus* spp. (e.g., *Haemophilus influenzae*); *Helicobacter* spp. (e.g., *Helicobacter pylori*); *Legionella* spp. (e.g., *Legionella pneumophila*); *Leptospira* spp. (e.g., *Leptospira interrogans*); *Listeria* spp. (e.g., *Listeria monocytogenes*); *Mycobacterium* spp. (e.g., *Mycobacterium leprae, Mycobacterium tuberculosis, Mycobacterium ulcerans*); *Mycoplasma* spp. (e.g., *Mycoplasma pneumoniae*); *Neisseria* spp. (e.g., *Neisseria gonorrhoeae, Neisseria meningitidis*); *Pseudomonas* spp. (e.g., *Pseudomonas aeruginosa*); *Rickettsia spp.* (e.g., *Rickettsia rickettsii*); *Salmonella* spp. (e.g., *Salmonella typhi, Salmonella typhimurium*); *Shigella* spp. (e.g., *Shigella sonnei*); *Staphylococcus* spp. (e.g., *Staphylococcus aureus, Staphylococcus epidermidis, Staphylococcus saprophyticus*); *Streptococcus* spp. (e.g., *Streptococcus agalactiae, Streptococcus pneumoniae, Streptococcus pyogenes*); *Treponema* spp. (e.g., *Treponema pallidum*); *Pseudodiomarina* spp.(e.g., *P. maritima*); *Marinobacter* spp. (e.g., *Marinobacter hydrocarbonoclasticus, Marinobacter vinifirmus*) *Alcanivorax* spp. (e.g., *alcanivorax dieselolei*);*Acetinobacter* spp. (e.g., *A. venetianus*); *Halomonas* spp. (e.g., *H. shengliensis*); *Labrenzia* spp.; *Microbulifer* spp. (e.g., *M. schleiferi*); *Shewanella* spp. (e.g., *S. algae*); *Vibrio* spp. (e.g., *Vibrio cholerae, Vibrio alginolyticus, Vibrio hepatarius*); and *Yersinia* spp. (e.g., *Yersinia pestis*).

In some embodiments, the bacterium is *Bacillus anthracis* (causing anthrax), *Bordetella pertussis* (causing whooping cough), *Corynebacterium diphtheriae* (causing diphtheria), *Clostridium tetani* (causing tetanus), *Haemophilus influenzae* type b, pneumococcus (causing pneumococcal infections), *Staphylococci* spp. (including Group A or B streptococci), *Mycobacterium tuberculosis, Neiserria meningitidis* (causing meningococcal disease), *Salmonella typhi* (causing typhoid), *Vibrio cholerae* (causing Cholera), or *Yersinia pestis* (causing plague).

In some embodiments, the bacterium is a Gram-negative bacterium. Non-limiting examples of gram-negative bacterial species include: *Neisseria* species including *Neisseria gonorrhoeae* and *Neisseria meningitidis*, *Branhamella* species including *Branhamella catarrhalis*, *Escherichia* species including *Escherichia coli*, *Enterobacter* species, *Proteus* species including *Proteus mirabilis*, *Pseudomonas* species including *Pseudomonas aeruginosa*, *Pseudomonas mallei*, and *Pseudomonas pseudomallei*, *Klebsiella* species including *Klebsiella pneumoniae*, *Salmonella* species, *Shigella* species, *Serratia* species, *Acinetobacter* species; *Haemophilus* spe cies including *Haemophilus influenzae* and *Haemophilus ducreyi*; *Brucella* species, *Yersinia* species including *Yersinia pestis* and *Yersinia enterocolitica*, *Francisella* species including *Francisella tularensis*, *Pasturella* species including *Pasteurella multocida*, *Vibrio cholerae*, *Flavobacterium* species, *meningosepticum*, *Campylobacter* species including *Campylobacter jejuni*, *Bacteroides* species (oral, pharyngeal) including *Bacteroides fragilis*, *Fusobacterium* species including *Fusobacteritun nucleatum*, *Calymmatobacterium granulomatis*, *Streptobacillus* species including *Streptobacillus moniliformis*, *Legionella* species including *Legionella pneumophila*.

In some embodiments, the bacterium is a Gram-positive bacterium. Exemplary Gram-positive bacteria include, but are not limited to, *Staphylococcus* spp., *Streptococcus* spp., *Micrococcus* spp., *Peptococcus* spp., *Peptostreptococcus* spp., *Enterococcus* spp., *Bacillus* spp., *Clostridium* spp., *Lactobacillus* spp., *Listeria* spp., *Erysipelothrix* spp., *Propionibacterium* spp., *Eubacterium* spp., *Corynebacterium.* spp., *Capnocytophaga* spp., *Bifidobacterium* spp., and *Gardnerella* spp.. In some embodiments, the Gram-positive bacteria is a bacteria of the phylum *Firmicutes*. In some embodiments, the Gram-positive bacteria is *Streptococcus*.

Other types of bacteria that can cause infection in a subject having thymic dysfunction include acid-fast bacilli, spirochetes, and actinomycetes. Examples of acid-fast bacilli include *Mycobacterium* species including *Mycobacterium tuberculosis* and *Mycobacterium leprae*. Examples of spirochetes include *Treponema* species including *Treponema pallidum*, *Treponetna pertenue*, *Borrelia* species including *Borrelia burgdorferi* (Lyme disease), and *Borrelia recurrentis*, and *Leptospira* species. Examples of actinomycetes include: *Actinomyces* species including *Actinomyces israelii*, and *Nocardia* species including *Nocardia asteroides*.

In some embodiments, the infection is caused by a virus. Examples of viruses include but are not limited to: Retroviruses, human immunodeficiency viruses including HIV-1, HDTV-III, LAVE, HTLV-III/LAV, HIV-III, HIV-LP, Cytomegaloviruses (CMV), Picornaviruses, polio viruses, hepatitis A virus, enteroviruses, human Coxsackie viruses, rhinoviruses, echoviruses, Calciviruses, Togaviruses, equine encephalitis viruses, rubella viruses, Flaviruses, dengue viruses, encephalitis viruses, yellow fever viruses, Coronaviruses, Rhabdoviruses, vesicular stomatitis viruses, rabies viruses, Filoviruses, ebola virus, Paramyxoviruses, parainfluenza viruses, mumps virus, measles virus, respiratory syncytial virus (RSV), Orthomyxoviruses, influenza viruses, Bungaviruses, Hantaan viruses, phleboviruses and Nairo viruses, Arena viruses, hemorrhagic fever viruses, reoviruses, orbiviruses, rotaviruses, Birnaviruses, Hepadnaviruses, Hepatitis B virus, parvoviruses, Papovaviridae, papilloma viruses, polyoma viruses, Adenoviruses, Herpesviruses including herpes simplex virus 1 and 2, varicella zoster virus, Poxviruses, variola viruses, vaccinia viruses, Irido viruses, African swine fever virus, delta hepatitis virus, non-A, non-B hepatitis virus, Hepatitis C, Norwalk viruses, astroviruses, and unclassified viruses. In some embodiments, the virus is adenovirus, enterovirus such as poliomyelitis (polio), Ebola virus, herpes viruses such as herpes simplex virus, cytomegalovirus and varicella-zoster (chickenpox and shingles), measles, mumps, rubella, hepatitis-A, -B, or-C, human papilloma virus, Influenza virus, rabies, Japanese encephalitis, rotavirus, human immunodeficiency virus (HIV), respiratory syncytial virus (RSV), smallpox, yellow fever, Zika Virus, or Dengue virus.

In some embodiments, the infection is caused by a fungus. Examples of fungi include, but are not limited to: *Cryptococcus* species including *Crytococcus neoformans*, *Histoplasma* species including *Histoplasma capsulatum*, *Coccidioides* species including *Coccidioides immitis*, *Paracoccidioides* species including *Paracoccidioides brasiliensis*, *Blastomyces* species including *Blastomyces dermatitidis*, *Chlamydia* species including *Chlamydia tra-* chomatis, *Candida* species including *Candida albicans*, *Sporothrix* species including *Sporothrix schenckii*, *Aspergillus* species, and fungi of mucormycosis. In some embodiments, the fungus is *Candida* spp., *Aspergillus* spp., *Cryptococcus* spp., *Mucormycete*, *Blastomyces dermatitidis* (causing blastomycosis), or endemic mycosis causing fungus such as *Histoplasma capsulatum* (causing histoplasmosis), or *Sporothrix schenckii* (causing sporotrichosis).

Other infectious organisms that can cause infection in a subject having thymic dysfunction include, without limitation: parasites. Parasites include *Plasmodium* species, such as *Plasmodium* species including *Plasmodium falciparum*, *Plasmodium malariae*, *Plasmodium ovale*, and *Plasmodium vivax* and *Toxoplasma gondii*. Blood-borne and/or tissues parasites include *Plasmodium* species, *Babesia* species including *Babesia microti* and *Babesia divergens*, *Leishmania* species including *Leishmania tropica*, *Leishmania species*, *Leishmania braziliensis*, *Leishmania donovani*, *Trypanosoma* species including *Trypanosoma gambiense*, *Trypanosoma rhodesiense* (African sleeping sickness), and *Trypanosoma cruzi* (Chagas' disease). In some embodiments, the parasite is Plasmodium spp., Leishmania, or a helminth.

Other medically relevant microorganisms have been described extensively in the literature, e.g., see C. G. A Thomas, *Medical Microbiology*, Bailliere Tindall, Great Britain 1983, incorporated herein by reference.

In some embodiments, the disease associated with thymic dysfunction is cancer. Types of cancer that may be treated using the methods disclosed herein include, without limitation, neoplasms, malignant tumors, metastases, or any disease or disorder characterized by uncontrolled cell growth such that it would be considered cancerous. The cancer may be a primary or metastatic cancer. Cancers include, but are not limited to, biliary tract cancer; bladder cancer; brain cancer including glioblastomas and medulloblastomas; breast cancer; cervical cancer; choriocarcinoma; colon cancer; endometrial cancer; esophageal cancer; gastric cancer; hematological neoplasms including acute lymphocytic and myelogenous leukemia; multiple myeloma; AIDS-associated leukemias and adult T-cell leukemia lymphoma; intraepithelial neoplasms including Bowen's disease and Paget's disease; liver cancer; lung cancer lymphomas including Hodgkin's disease and lymphocytic lymphomas; neuroblastomas; oral cancer including squamous cell carcinoma; ovarian cancer including those arising from epithelial cells, stromal cells, germ cells and mesenchymal cells; pancreatic cancer; prostate cancer; rectal cancer; sarcomas including leiomyosarcoma, rhabdomyosarcoma, liposarcoma, fibrosarcoma, and osteosarcoma; skin cancer including melanoma, Kaposi's sarcoma, basocellular cancer, and squamous cell cancer; testicular cancer including germinal tumors such as seminoma, non-seminoma, teratomas, choriocarcinomas; stromal tumors and germ cell tumors; thyroid cancer including thyroid adenocarcinoma and medullar carcinoma; and renal cancer including adenocarcinoma and Wilms' tumor. Commonly encountered cancers include breast, prostate, lung, ovarian, colorectal, and brain cancer. In some embodiments, the cancer is metastatic.

MSC exosomes are found herein to have therapeutic effects against diseases associated with thymic dysfunction. An "exosome" is a membrane (e.g., lipid bilayer) vesicle that is released from a cell (e.g., any eukaryotic cell). Exosomes are present in eukaryotic fluids, including blood, urine, and cultured medium of cell cultures. The exosomes of the present disclosure are released from mesenchymal stem cells (MSCs) and are interchangeably termed "mesenchymal stem cell exosomes" or "MSC exosomes."

A "mesenchymal stem cell (MSC)" is a progenitor cell having the capacity to differentiate into neuronal cells, adipocytes, chondrocytes, osteoblasts, myocytes, cardiac tissue, and other endothelial or epithelial cells. (See for example Wang, Stem Cells 2004;22(7);1330-7; McElreavey;1991 Biochem Soc Trans (1);29s; Takechi, Placenta 1993 March/April; 14 (2); 235-45; Takechi, 1993; Kobayashi; Early Human Development;1998; July 10; 51 (3); 223-33; Yen; Stem Cells; 2005; 23 (1) 3-9.) These cells may be defined phenotypically by gene or protein expression. These cells have been characterized to express (and thus be positive for) one or more of CD13, CD29, CD44, CD49a, b, c, e, f, CD51, CD54, CD58, CD71, CD73, CD90, CD102, CD105, CD106, CDw119, CD120a, CD120b, CD123, CD124, CD126, CD127, CD140a, CD166, P75, TGF-bIR, TGF-bIIR, HLA-A, B, C, SSEA-3, SSEA-4, D7 and PD-L1. These cells have also been characterized as not expressing (and thus being negative for) CD3, CDS, CD6, CD9, CD10, CD11a, CD14, CD15, CD18, CD21, CD25, CD31, CD34, CD36, CD38, CD45, CD49d, CD50, CD62E, L, S, CD80, CD86, CD95, CD117, CD133, SSEA-1, and ABO. Thus, MSCs may be characterized phenotypically and/or functionally according to their differentiation potential.

MSCs may be harvested from a number of sources including but not limited to bone marrow, blood, periosteum, dermis, umbilical cord blood and/or matrix (e.g., Wharton's Jelly), and placenta. Methods for harvesting MSCs are described in the art, e.g., in U.S. Pat. No. 5,486,359, incorporated herein by reference.

MSCs can be isolated from multiple sources, e.g., bone marrow mononuclear cells, umbilical cord blood, adipose tissue, placental tissue, based on their adherence to tissue culture plastic. For example, MSCs can be isolated from commercially available bone marrow aspirates. Enrichment of MSCs within a population of cells can be achieved using methods known in the art including but not limited to fluorescence-activated cell sorting (FACS).

Commercially available media may be used for the growth, culture and maintenance of MSCs. Such media include but are not limited to Dulbecco's modified Eagle's medium (DMEM). Components in such media that are useful for the growth, culture and maintenance of MSCs, fibroblasts, and macrophages include but are not limited to amino acids, vitamins, a carbon source (natural and non-natural), salts, sugars, plant derived hydrolysates, sodium pyruvate, surfactants, ammonia, lipids, hormones or growth factors, buffers, non-natural amino acids, sugar precursors, indicators, nucleosides and/or nucleotides, butyrate or organics, DMSO, animal derived products, gene inducers, non-natural sugars, regulators of intracellular pH, betaine or osmoprotectant, trace elements, minerals, non-natural vitamins. Additional components that can be used to supplement a commercially available tissue culture medium include, for example, animal serum (e.g., fetal bovine serum (FBS), fetal calf serum (FCS), horse serum (HS)), antibiotics (e.g., including but not limited to, penicillin, streptomycin, neomycin sulfate, amphotericin B, blasticidin, chloramphenicol, amoxicillin, bacitracin, bleomycin, cephalosporin, chlortetracycline, zeocin, and puromycin), and glutamine (e.g., L-glutamine). Mesenchymal stem cell survival and growth also depends on the maintenance of an appropriate aerobic environment, pH, and temperature. MSCs can be maintained using methods known in the art, e.g., as described in Pittenger et al., Science, 284:143-147 (1999), incorporated herein by reference.

In some embodiments, the MSC exosomes used to treat diseases associated with thymic dysfunction are isolated exosomes. As used herein, an "isolated exosome" is an exosome that is physically separated from its natural environment. An isolated exosome may be physically separated, in whole or in part, from tissue or cells with which it naturally exists, including MSCs, fibroblasts, and macrophages. In some embodiments, the isolated exosomes are MSC exosomes, In some embodiments, the MSC exosomes are isolated from the culturing media of MSCs from human bone marrow, or umbilical cord Wharton's Jelly. Such culturing media is termed "MSC-conditioned media" herein. In some embodiments, isolated exosomes may be free of cells such as MSCs, or it may be free or substantially free of conditioned media, or it may be free of any biological contaminants such as proteins. Typically, the isolated exosomes are provided at a higher concentration than exosomes present in unmanipulated conditioned media.

In some embodiments, the isolated MSC exosome is substantially free of contaminants (e.g., protein contaminants). The isolated MSC exosome is "substantially free of contaminants" when the preparation of the isolated MSC exosome contains fewer than 20%, 15%, 10%, 5%, 2%, 1%, or less than 1%, of any other substances (e.g., proteins). In some embodiments, the isolated MSC is "substantially free of contaminants" when the preparation of the isolated MSC exosome is at least 80%, at least 85%, at least 90%, at least 95%, at least 98%, at least 99%, at least 99.9% pure, with respect to contaminants (e.g., proteins).

"Protein contaminants" refer to proteins that are not associated with the isolated exosome and do not contribute to the biological activity of the exosome. The protein contaminants are also referred to herein as "non-exosomal protein contaminants."

The MSC exosome described herein has a diameter of about 30-150 nm. For example, the MSC exosome may have a diameter of 30-150, 30-140, 30-130, 30-120, 30-110, 30-100, 30-90, 30-80, 30-70, 30-60, 30-50, 30-40, 40-150, 40-140, 40-130, 40-120, 40-110, 40-100, 40-90, 40-80, 40-70, 40-60, 40-50, 50-150 nm, 50-140 nm, 50-130 nm, 50-120 nm, 50-110 nm, 50-100 nm, 50-90 nm, 50-80 nm, 50-70 nm, 50-60 nm, 60-150 nm, 60-140 nm, 60-130 nm, 60-120 nm, 60-110 nm, 60-100 nm, 60-90 nm, 60-80 nm, 60-70 nm, 70-150 nm, 70-140 nm, 70-130 nm, 70-120 nm, 70-110 nm, 70-100 nm, 70-90 nm, 70-80 nm, 80-150 nm, 80-140 nm, 80-130 nm, 80-120 nm, 80-110 nm, 80-100 nm, 80-90 nm, 90-150 nm, 90-140 nm, 90-130 nm, 90-120 nm, 90-110 nm, 90-100 nm, 100-150 nm, 100-140 nm, 100-130 nm, 100-120 nm, 100-110 nm, 110-150 nm, 110-140 nm, 110-130 nm, 110-120 nm, 120-150 nm, 120-140 nm, 120-130 nm, 130-150 nm, 130-140 nm, or 140-150 nm. In some embodiments, the MSC exosome may have a diameter of about 50 nm, 60 nm, 70 nm, 80 nm, 90 nm, 100 nm, 110 nm, 120 nm, 130 nm, 140 nm, or 150 nm. In some embodiments, the MSC exosomes exhibit a biconcave morphology.

The MSC exosomes (e.g., isolated MSC exosomes) may be used for treating the diseases associated with thymic dysfunction. In some embodiments, the MSC exosomes (e.g., isolated MSC exosomes) are formulated in a composition. In some embodiments, the composition further comprises pharmaceutically acceptable concentrations of salt, buffering agents, preservatives, compatible carriers, and and/or other (i.e., secondary) therapeutic agents.

A pharmaceutically acceptable carrier is a pharmaceutically acceptable material, composition or vehicle, such as a liquid or solid filler, diluent, excipient, solvent or encapsulating material, involved in carrying or transporting a prophylactically or therapeutically active agent. Each carrier must be "acceptable" in the sense of being compatible with the other ingredients of the formulation and not injurious to the subject. Some examples of materials which can serve as pharmaceutically acceptable carriers include sugars, such as lactose, glucose and sucrose; glycols, such as propylene glycol; polyols, such as glycerin, sorbitol, mannitol and polyethylene glycol; esters, such as ethyl oleate and ethyl laurate; buffering agents, such as magnesium hydroxide and aluminum hydroxide; pyrogen-free water; isotonic saline; Ringer's solution; ethyl alcohol; phosphate buffer solutions; and other non-toxic compatible substances employed in pharmaceutical formulations.

To treat the disease associated with thymic dysfunction, an effective amount of the MSC exosomes or the composition comprising the MSC exosomes is administered to a subject having thymic dysfunction. An "effective amount" is the amount of an agent that achieves the desired outcome. The absolute amount will depend upon a variety of factors, including the material selected for administration, whether the administration is in single or multiple doses, and individual patient parameters including age, physical condition, size, weight, and the stage of the disease. These factors are well known to those of ordinary skill in the art and can be addressed with no more than routine experimentation.

In some embodiments, the effective amount is a dosage of an agent that causes no toxicity to the subject. In some embodiments, the effective amount is a dosage of an agent that causes reduced toxicity to the subject. Methods for measuring toxicity are well known in the art (e.g., biopsy/histology of the liver, spleen, and/or kidney; alanine transferase, alkaline phosphatase and bilirubin assays for liver toxicity; and creatinine levels for kidney toxicity).

"Treat" or "treatment" includes, but is not limited to, preventing, reducing, or halting the development of a lung disease, reducing or eliminating the symptoms of lung disease, or preventing lung disease.

A subject shall mean a human or vertebrate animal or mammal including but not limited to a rodent, e.g., a rodent such as a rat or a mouse, dog, cat, horse, cow, pig, sheep, goat, turkey, chicken, and primate, e.g., monkey. In some embodiments, the subject is human. In some embodiments, the subject is a companion animal. "A companion animal," as used herein, refers to pets and other domestic animals. Non-limiting examples of companion animals include dogs and cats; livestock such as horses, cattle, pigs, sheep, goats, and chickens; and other animals such as mice, rats, guinea pigs, and hamsters. The methods of the present disclosure are useful for treating a subject in need thereof. A subject in need thereof can be a subject who has or is has a risk of developing a disease associated with thymic dysfunction.

The subjects may be those that have a disease described herein amenable to treatment using the exosomes described in this disclosure, or they may be those that are at risk of developing such a disease. In some embodiments, the subject is a human subject. In some embodiments, the subject is a human infant. For example, the subject may be a neonate and particularly neonates born at low gestational age. As used herein, a human neonate refers to an human from the time of birth to about 4 weeks of age. As used herein, a human infant refers to a human from about the age of 4 weeks of age to about 3 years of age. As used herein, low gestational age refers to birth (or delivery) that occurs before a normal gestational term for a given species. In humans, a full gestational term is about 40 weeks and may range from 37 weeks to more than 40 weeks. Low gestational age, in humans, akin to a premature birth is defined as birth that occurs before 37 weeks of gestation. The disclosure therefore contemplates prevention and/or treatment of subjects born before 37 weeks of gestation, including those born at even shorter gestational terms (e.g., before 36, before 35, before 34, before 33, before 32, before 31, before 30, before 29, before 28, before 27, before 26, or before 25 weeks of gestation).

For infants or neonates, the present disclosure contemplates their treatment even beyond the neonate stage and into childhood and/or adulthood. For example, in some embodiments, the subject treated using the methods of the present disclosure is 3-18 years of age. In some embodiments, the subject treated using the methods of the present disclosure may be 3-18, 3-17, 3-16, 3-15, 3-14, 3-13, 3-12, 3-11, 3-10, 3-9, 3-8, 3-7, 3-6, 3-5, 3-4, 4-18, 4-17, 4-16, 4-15, 4-14, 4-13, 4-12, 4-11, 4-10, 4-9, 4-8, 4-7, 4-6, 4-5, 5-18, 5-17, 5-16, 5-15, 5-14, 5-13, 5-12, 5-11, 5-10, 5-9, 5-8, 5-7, 5-6, 6-18, 6-17, 6-16, 6-15, 6-14, 6-13, 6-12, 6-11, 6-10, 6-9, 6-8, 6-7, 7-18, 7-17, 7-16, 7-15, 7-14, 7-13, 7-12, 7-11, 7-10, 7-9, 7-8, 8-18, 8-17, 8-16, 8-15, 8-14, 8-13, 8-12, 8-11, 8-10, 8-9, 9-18, 9-17, 9-16, 9-15, 9-14, 9-13, 9-12, 9-11, 9-10, 10-18, 10-17, 10-16, 10-15, 10-14, 10-13, 10-12, 10-11, 11-18, 11-17, 11-16, 11-15, 11-14, 11-13, 11-12, 12-18, 12-17, 12-16, 12-15, 12-14, 12-13, 13-18, 13-17, 13-16, 13-15, 13-14, 14-18, 14-17, 14-16, 14-15, 15-18, 15-17, 15-16, 16-18, 16-17, or 17-18 years of age. In some embodiments, the subject is an adult, e.g., 18 or more than 18 years of age.

Certain subjects may have a genetic predisposition to certain forms of the diseases (or conditions) described herein (for example, autoimmune diseases or cancer), and those subjects may also be treated according to the disclosure.

With respect to neonates and particularly low gestation age neonates, the disclosure contemplates administration of the isolated MSC exosomes within 1 year, 11 months, 10 months, 9 months, 8 months, 7 months, 6 months, 5 months, 4 months, 3 months, 2 months, 1 month, 4 weeks, 3 weeks, 2 weeks, 1 week, 6 days, 5 days, 4 days, 3 days, 2 days, 1 day, 12 hours, 6 hours, 3 hours, or 1 hour of birth. In some embodiments, the isolated MSC exosomes are administered within 1 hour of birth (e.g., within 1 hour, within 55 minutes, within 50 minutes, within 45 minutes, within 40 minutes, within 35 minutes, within 30 minutes, within 25 minutes, within 20 minutes, within 15 minutes, within 10 minutes, within 5 minutes, or within 1 minute). In some embodiments, the MSC exosome is administered to the subject immediately after birth.

The present disclosure further contemplates administration of the MSC exosomes even in the absence of symptoms indicative of a disease or disorder as described herein.

In some embodiments, the MSC exosome or the composition comprising the isolated exosome is administered to a subject (e.g., a neonate) once. In some embodiments, repeated administration of the MSC exosomes, including two, three, four, five or more administrations of the MSC exosomes, is contemplated. In some instances, the MSC exosomes may be administered continuously. Repeated or continuous administration may occur over a period of several hours (e.g., 1-2, 1-3, 1-6, 1-12, 1-18, or 1-24 hours), several days (e.g., 1-2, 1-3, 1-4, 1-5, 1-6 days, or 1-7 days) or several weeks (e.g., 1-2 weeks, 1-3 weeks, or 1-4 weeks) depending on the severity of the condition being treated. If administration is repeated but not continuous, the time in between administrations may be hours (e.g., 4 hours, 6 hours, or 12 hours), days (e.g., 1 day, 2 days, 3 days, 4 days, 5 days, or 6 days), or weeks (e.g., 1 week, 2 weeks, 3 weeks, or 4 weeks). The time between administrations may be the same or they may differ. As an example, if the symptoms of the disease appear to be worsening the a-type exosomes may be administered more frequently, and then once the symptoms are stabilized or diminishing the a-type exosomes may be administered less frequently.

In some embodiments, the MSC exosomes are administered at least once within 24 hours of birth and then at least once more within 1 week of birth. In some embodiments, the MSC exosomes are administered at least once within 1 hour of birth and then at least once more within 3-4 days of birth.

The MSC exosomes may be administered by any route that effects delivery to the thymus. Systemic administration routes such as intravenous injection or continuous infusion are suitable.

The MSC exosomes, may be formulated for parenteral administration by injection, including for example by bolus injection or continuous infusion. Formulations for injection may be presented in unit dosage form, e.g., in ampoules or in multi-dose containers, with or without an added preservative. The compositions may take such forms as water-soluble suspensions, solutions or emulsions in oily or aqueous vehicles, and may contain formulatory agents such as suspending, stabilizing and/or dispersing agents. Suitable lipophilic solvents or vehicles include fatty oils such as sesame oil, or synthetic fatty acid esters, such as ethyl oleate or triglycerides. Aqueous injection suspensions may contain substances which increase the viscosity of the suspension, such as sodium carboxymethyl cellulose, sorbitol, or dextran. Optionally, the suspension may also contain suitable stabilizers or agents which increase solubility. Alternatively, the exosomes may be in lyophilized or other powder or solid form for constitution with a suitable vehicle, e.g., sterile pyrogen-free water, before use.

It is to be understood that other agents to be administered to subjects being treated according to the disclosure may be administered by any suitable route including oral administration, intranasal administration, intratracheal administration, inhalation, intravenous administration, etc. Those of ordinary skill in the art will know the customary routes of administration for such secondary agents.

In some embodiments, the MSC exosomes, or the composition comprising the MSC exosomes, when administered to a subject, improves thymus function. Herein, thymus function is considered to be "improved" when the functionality of the thymus, e.g., as measured by any methods known to the skilled artisan, is improved by at least 20% in subjects that have been administered the MSC exosomes, compared to in subjects that have not been administered the MSC exosomes. For example, thymus function may be considered improved when the functionality of the thymus, e.g., as measured by any methods known to the skilled artisan, is improved by at least 20%, at least 30%, at least 40%, at least 50%, at least 70%, at least 80%, at least 90%, at least 100%, at least 2-fold, at least 5-fold, at least 10-fold, at least 50-fold, at least 100-fold or more, in subjects that have been administered the MSC exosomes, compared to in subjects that have not been administered the MSC exosomes. In some embodiments, thymus function is considered to be improved when the functionality of the thymus, e.g., as measured by any methods known to the skilled artisan, is improved by 20%, 30%, 40%, 50%, 70%, 80%, 90%, 100%, 2-fold, 5-fold, 10-fold, 50-fold, 100-fold or more, in subjects that have been administered the MSC exosomes, compared to in subjects that have not been administered the MSC exosomes.

Methods of evaluating thymus function are known to those skilled in the art. Non-limiting examples of such methods include measuring the size and/or the cortico-medullary ratio, imaging of the thymus, assessing the ability of T cell production by the thymus, and/or evaluating the subject's immune competence (e.g., against infection). Methods of evaluating thymus function are also described in the art, e.g., as described in Lorenzi et al., J Immunol Methods. 2008 Dec 31; 339(2): 185-194; Harris et al., Clin Immunol. 2005 May;115(2):138-46; Saidakova et al., Klin Lab Diagn. 2011 Nov;(11):45-9; and Frush et al., Pediatric Chest Imaging pp 215-240, incorporated herein by reference. For example, a common test for assessing thymic function is by analysis of T cell receptor excision circles (TRECs) in peripheral blood, which are present in the thymocytes that exit the thymus (e.g., as described in Lorenzi et al, J Immunol Methods. 2008 Dec 31; 339(2), incorporated herein by reference).

In some embodiments, the MSC exosomes, or the composition comprising the MSC exosomes, when administered to a subject, restores thymic architecture. In some embodiments, thymic architecture is considered to be "restored" when the architecture of the thymus, e.g., as indicated by the cortico-medullary ratio of the thymus (see FIG. 1E), is increased by at least 20% in subjects that have been administered the MSC exosomes, compared to in subjects that have not been administered the MSC exosomes. For example, thymic architecture may be considered "restored" when the architecture of the thymus, e.g., as indicated by the cortico-medullary ratio of the thymus (see FIG. 1E), is increased by at least 20%, at least 30%, at least 40%, at least 50%, at least 70%, at least 80%, at least 90%, at least 100%, at least 2-fold, at least 5-fold, at least 10-fold, at least 50-fold, at least 100-fold or more, in subjects that have been administered the MSC exosomes, compared to in subjects that have not been administered the MSC exosomes. In some embodiments, thymic architecture is considered "restored" when the architecture of the thymus, e.g., as indicated by the cortico-medullary ratio of the thymus (see FIG. 1E), is increased by 20%, 30%, 40%, 50%, 70%, 80%, 90%, 100%, 2-fold, 5-fold, 10-fold, 50-fold, 100-fold or more, in subjects that have been administered the MSC exosomes, compared to in subjects that have not been administered the MSC exosomes.

In some embodiments, the MSC exosomes, or the composition comprising the MSC exosomes, when administered to a subject, restores thymic development. In some embodiments, thymic development is considered to be "restored" when the number of thymocytes (also termed "thymocyte counts") is increased by at least 20% in subjects that have been administered the MSC exosomes, compared to in subjects that have not been administered the MSC exosomes. For example, thymic development may be considered "restored" when the number of thymocytes is increased by at least 20%, at least 30%, at least 40%, at least 50%, at least 70%, at least 80%, at least 90%, at least 100%, at least 2-fold, at least 5-fold, at least 10-fold, at least 50-fold, at least 100-fold or more, in subjects that have been administered the MSC exosomes, compared to in subjects that have not been administered the MSC exosomes. In some embodiments, thymic development is considered "restored" when the number of thymocytes is increased by 20%, 30%, 40%, 50%, 70%, 80%, 90%, 100%, 2-fold, 5-fold, 10-fold, 50-fold, 100-fold or more, in subjects that have been administered the MSC exosomes, compared to in subjects that have not been administered the MSC exosomes.

In some embodiments, the MSC exosomes, or the composition comprising the MSC exosomes, when administered to a subject, restores thymocyte progenitor population in the thymus. In some embodiments, thymocyte progenitor population in the thymus is considered to be "restored" when the number of thymocyte progenitor cells is increased by at least 20% in subjects that have been administered the MSC exosomes, compared to in subjects that have not been administered the MSC exosomes. For example, thymocyte progenitor population in the thymus is considered to be "restored" when the number of thymocyte progenitor cells is increased by at least 20%, at least 30%, at least 40%, at least 50%, at least 70%, at least 80%, at least 90%, at least 100%, at least 2-fold, at least 5-fold, at least 10-fold, at least 50-fold, at least 100-fold or more, in subjects that have been administered the MSC exosomes, compared to in subjects that have not been administered the MSC exosomes. In some embodiments, thymocyte progenitor population in the thymus is considered to be "restored" when the number of thymocyte progenitor cells is increased by 20%, 30%, 40%, 50%, 70%, 80%, 90%, 100%, 2-fold, 5-fold, 10-fold, 50-fold, 100-fold or more, in subjects that have been administered the MSC exosomes, compared to in subjects that have not been administered the MSC exosomes.

In some embodiments, the MSC exosomes, or the composition comprising the MSC exosomes, when administered to a subject, reduces thymocyte apoptosis (e.g., induced by exposure to hyperoxia). "Apoptosis" refers to the death of cells that occurs as a normal and controlled part of an organism's growth or development. In some embodiments, thymocyte apoptosis is considered "reduced" when the number of thymocytes undergoing apoptosis is reduced by at least 20%, in subjects that have been administered the MSC exosomes, compared to in subjects that have not been administered the MSC exosomes. For example, thymocyte apoptosis may be considered "reduced" when the number of thymocytes undergoing apoptosis is reduced by at least 20%, at least 30%, at least 40%, at least 50%, at least 60%, at least 70%, at least 80%, at least 90%, at least 95%, at least 99%, or 100%, in subjects that have been administered the MSC exosomes, compared to in subjects that have not been administered the MSC exosomes. In some embodiments, thymocyte apoptosis is considered "reduced" when the number of thymocytes undergoing apoptosis is reduced by 20%, 30%, 40%, 50%, 60%, 70%, 80%, 90%, 95%, 99%, or 100%, in subjects that have been administered the MSC exosomes, compared to in subjects that have not been administered the MSC exosomes.

Figure 2A:
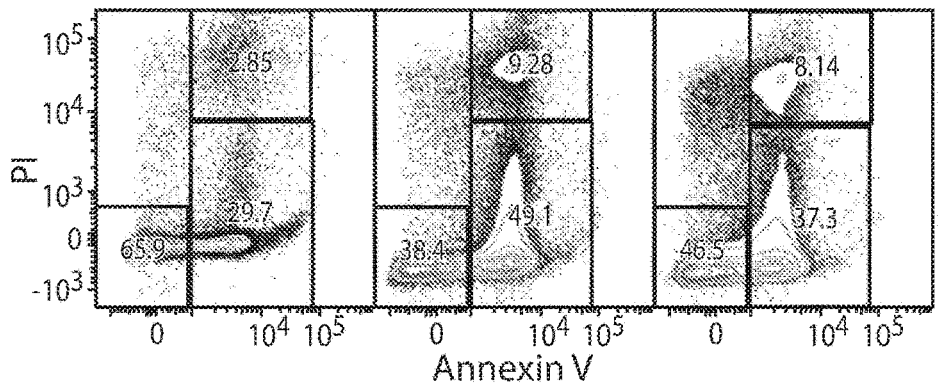
FIGS. 2A-2D. MSC-exosome treatment reduces oxygen-induced thymocyte apoptosis and promoted normal maturation of medullary TECs. Thymi from the three study groups were mechanically disrupted into single cell suspensions of thymocytes. Thymocytes were labelled with Annexin V and PI and analyses for apoptosis levels. Apoptotic cells were determined as AnnV+PI- cells.
Figure 2B:
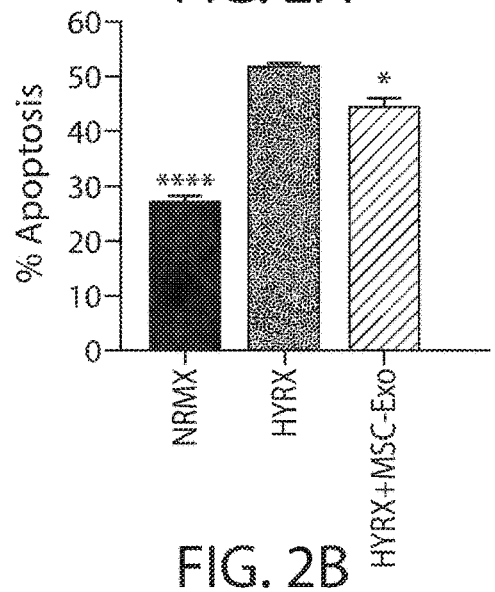
Figure 2C:
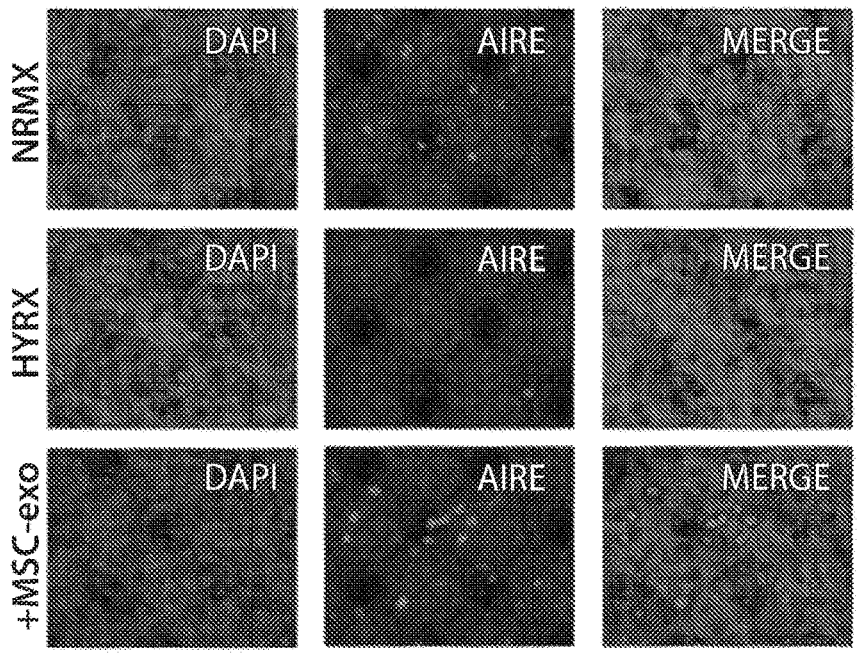
Figure 2D:
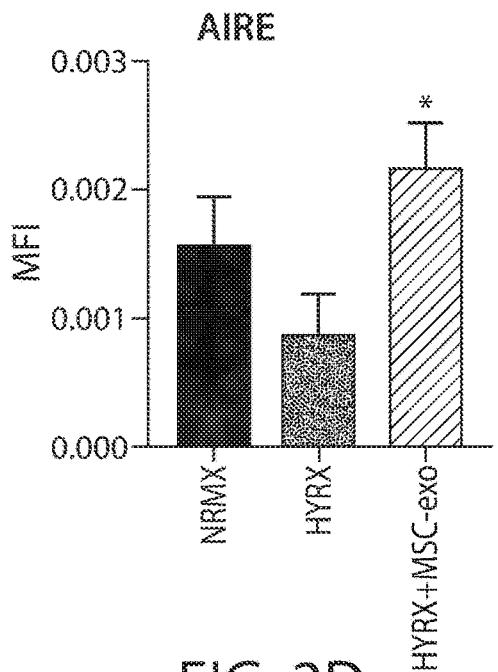
Figure 3A:
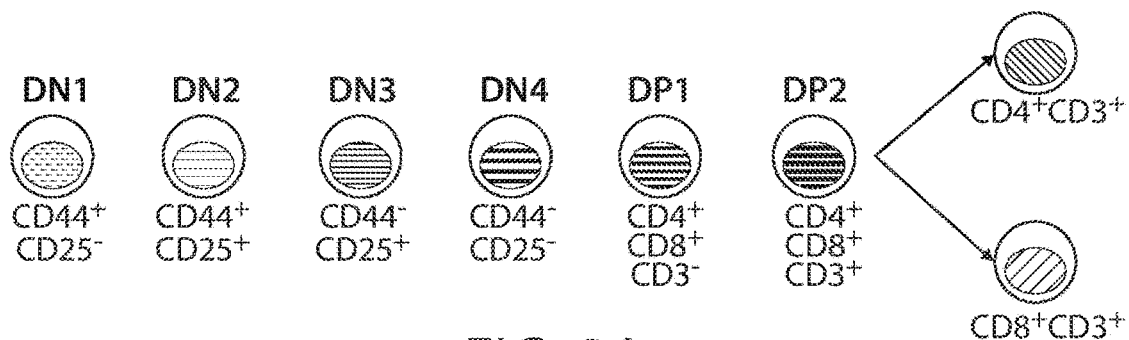
FIGS. 3A-3D. MSC-exosome treatment restores the thymocyte progenitor population in the thymus.
Figure 3B:
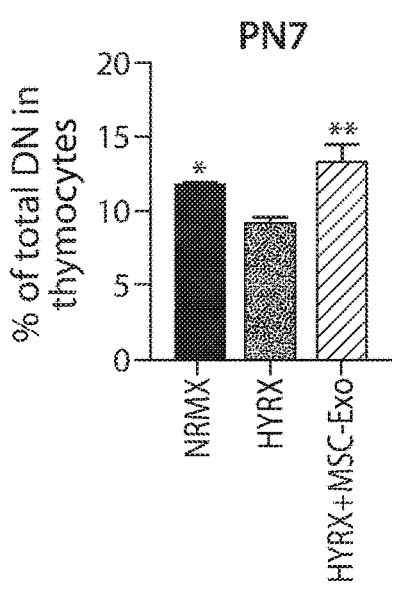
Figure 3C:
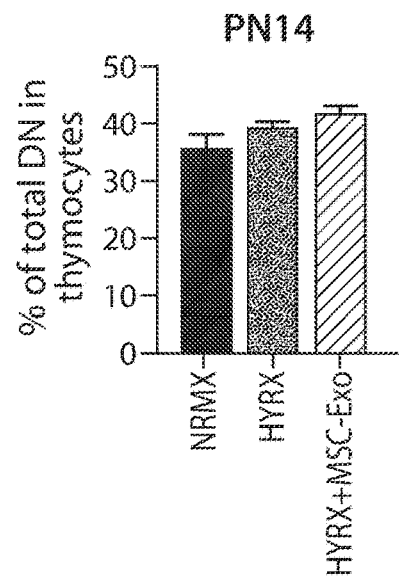
Figure 3D:
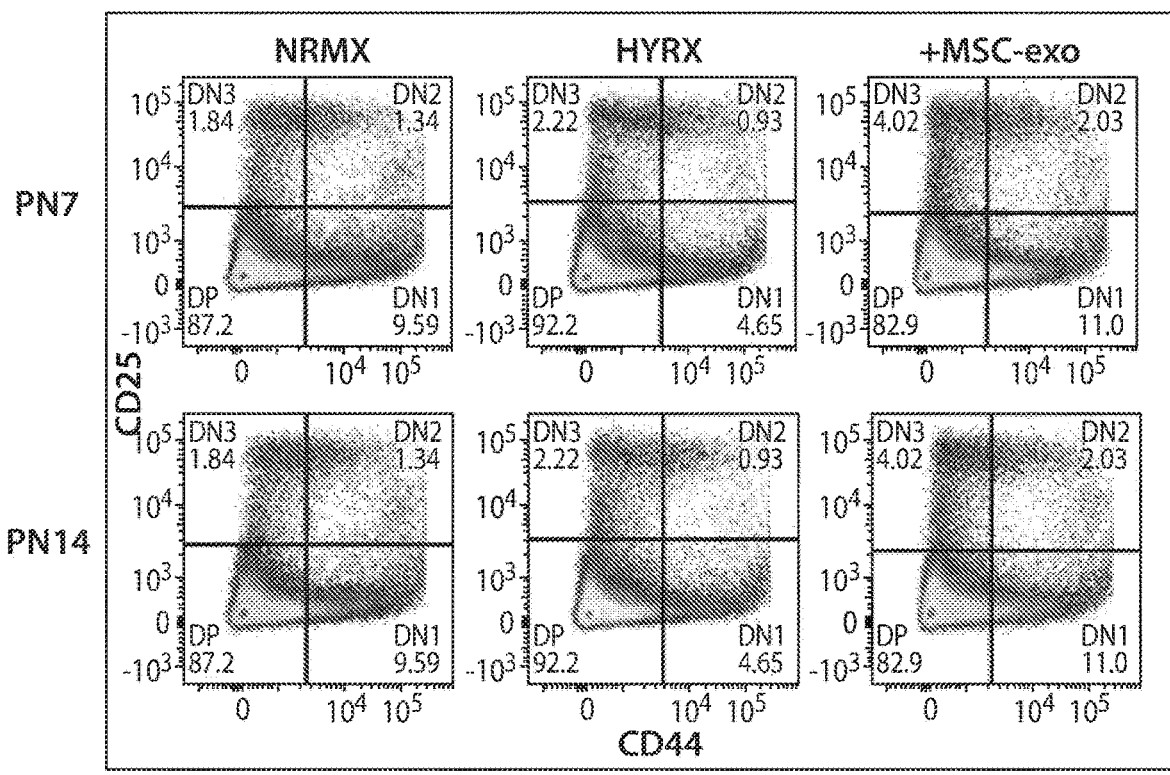
Figures 4A, 4B:
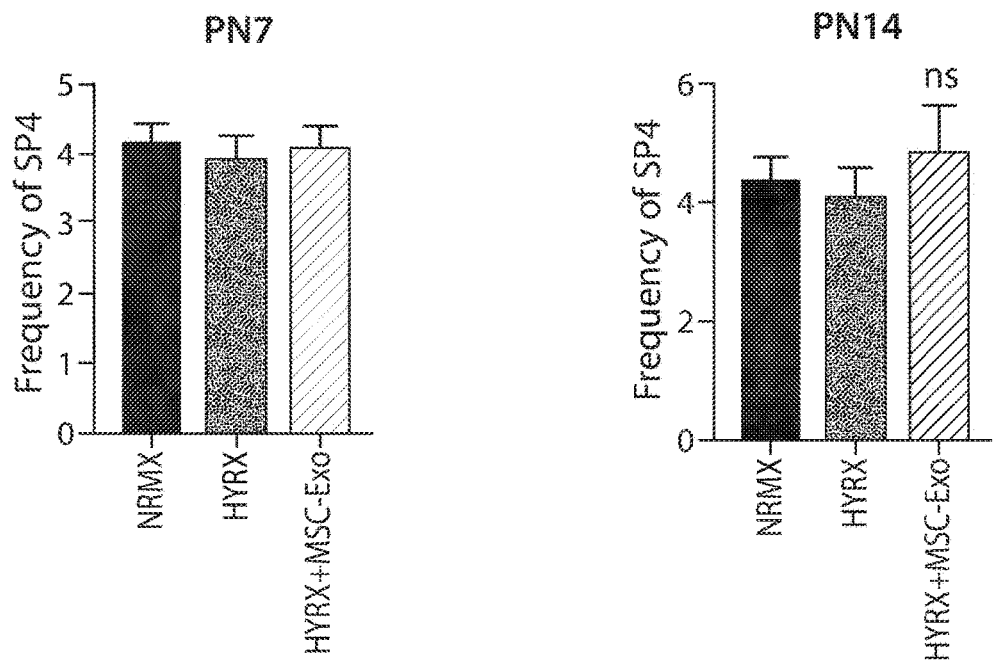
Figure 4F:
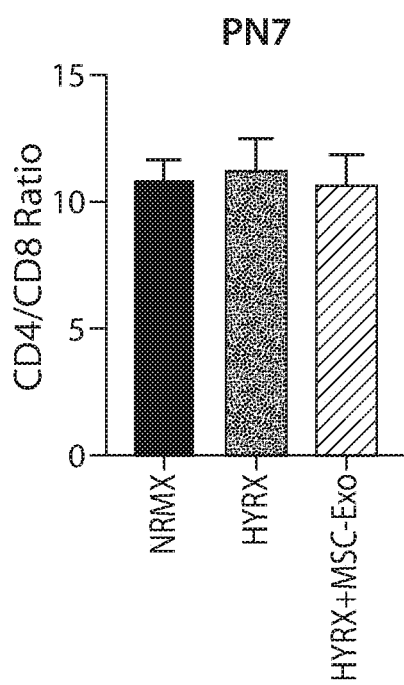
Figure 4G:
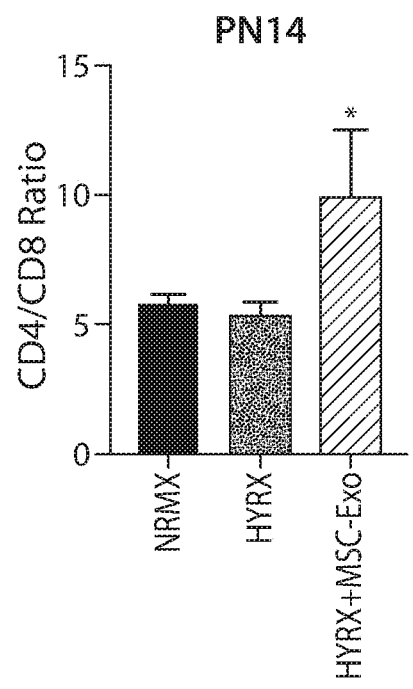

In some embodiments, the MSC exosomes, or the composition comprising the MSC exosomes, when administered to a subject, restores maturation of medullary thymic epithelial cells. "Medullary thymic epithelial cell" represent unique stromal cell population of the thymus which plays essential role in the establishment of central tolerance and are relevant for the development of functional mammal immune system. In some embodiments, maturation of medullary thymic epithelial cells is considered to be "restored" when the number of medullary thymic epithelial cells, e.g., as indicated by evaluating the expression level of the auto-immune regulator (AIRE, e.g., see FIG. 2E), is increased by at least 20% in subjects that have been administered the MSC exosomes, compared to in subjects that have not been administered the MSC exosomes. For example, maturation of medullary thymic epithelial cells may be considered to be "restored" when the number of medullary thymic epithelial cells, e.g., as indicated by evaluating the expression level of the autoimmune regulator (AIRE, e.g., see FIG. 2E), is increased by at least 20%, at least 30%, at least 40%, at least 50%, at least 70%, at least 80%, at least 90%, at least 100%, at least 2-fold, at least 5-fold, at least 10-fold, at least 50-fold, at least 100-fold or more, in subjects that have been administered the MSC exosomes, compared to in subjects that have not been administered the MSC exosomes. In some embodiments, maturation of medullary thymic epithelial cells is considered to be "restored" when the number of medullary thymic epithelial cells, e.g., as indicated by evaluating the expression level of the autoimmune regulator (AIRE, e.g., see FIG. 2E), is increased by 20%, 30%, 40%, 50%, 70%, 80%, 90%, 100%, 2-fold, 5-fold, 10-fold, 50-fold, 100-fold or more, in subjects that have been administered the MSC exosomes, compared to in subjects that have not been administered the MSC exosomes.

In some embodiments, the MSC exosomes, or compositions comprising the MSC exosomes are used together with other agents for treating any of the diseases described herein. In some embodiments, the MSC exosomes and the other agents are formulated in the same composition. In some embodiments, the MSC exosomes and the other agents are formulated in separate compositions. In some embodiments, the MSC exosomes and the other agents are administered to the subject simultaneously. In some embodiments, the MSC exosomes and the other agents are administered separately. In some embodiments, the MSC exosomes are administered before the other agents. In some embodiments, the MSC exosomes are administered after the other agents.

For example, for treating autoimmune diseases, the MSC exosomes may be used together with agents that are known to have therapeutic effects against autoimmune diseases. Such agents include, without limitation, non-steroidal anti-inflammatory drugs, glucocorticoids, metrotrexate, leflunomide, anti-TNF biologicals (e.g., antibodies such as infliximab, adalimumab, golinumab, or certolizumab pegol). Drugs for treating autoimmune diseases are known in the art, e.g., as described in Li et al., Front Pharmacol. 2017; 8: 460, incorporated herein by reference.

In some embodiments, for treating infection, the MSC exosomes are administered with other anti-infection agents. Non-limiting examples of anti-infection agents include antibacterial agents (e.g., antibiotics), anti-viral agents, anti-fungal agents, anti-parasitic agents.

In some embodiments, for treating cancer, the MSC exosomes are administered with other anti-cancer agents. In some embodiments, the anti-cancer agent is selected from the group consisting of: small molecules, oligonucleotides, polypeptides, and combinations thereof. In some embodiments, the anti-cancer agent is a chemotherapeutic agent. In some embodiments, the chemotherapeutic agent is selected from the group consisting of: Actinomycin, All-trans retinoic acid, Azacitidine, Azathioprine, Bleomycin, Bortezomib, Carboplatin, Capecitabine, Cisplatin, Chlorambucil, Cyclophosphamide, Cytarabine, Daunorubicin, Docetaxel, Doxifluridine, Doxorubicin, Epirubicin, Epothilone, Etoposide, Fluorouracil, Gemcitabine, Hydroxyurea, Idarubicin, Imatinib, Irinotecan, Mechlorethamine, Mercaptopurine, Methotrexate, Mitoxantrone, Oxaliplatin, Paclitaxel, Pemetrexed, Teniposide, Tioguanine, Topotecan, Valrubicin, Vinblastine, Vincristine, Vindesine, and Vinorelbine.

Some of the embodiments, advantages, features, and uses of the technology disclosed herein will be more fully understood from the Examples below. The Examples are intended to illustrate some of the benefits of the present disclosure and to describe particular embodiments, but are not intended to exemplify the full scope of the disclosure and, accordingly, do not limit the scope of the disclosure.

EXAMPLES

Bronchopulmonary dysplasia (BPD), is a multifactorial chronic lung disease which affects preterm newborns requiring oxygen supplementation. It is characterized by restricted lung growth and alveolar and blood vessel development which results in impaired pulmonary function. Up to date, BPD lacks effective therapeutic approaches for preventing or treating the oxygen-induced injuries. Previous work demonstrated that a single dose of MSC-exosomes significantly improved lung morphology, reduced lung fibrosis and promoted vascular remodeling in an experimental model of neonatal hyperoxia. These effects were mainly via inhibition of hyperoxia-induced inflammation, through modulation of macrophage phenotype in the lung[1].

In the neonates, the adaptive immune system is relatively underdeveloped, and the effect of prolonged hyperoxia on the thymus, an essential organ for the development of adaptive immune cells, remains unexplored. The thymic microenvironment is a three-dimensional cellular architecture composed of a set thymic epithelial cells (TECs) which guide the development and repertoire of T cells[2]. In experimental models of neonatal hyperoxia, the thymus has been shown to involute and to promote the maturation of autoreactive T cells. Oxygen-induced thymic involution was shown to be due to increased thymocyte apoptosis which induced a significant reduction in count and proliferation of double positive and double negative thymocytes[3,4].

Given the results obtained with MSC-exosomes in experimental BPD model, it was investigated herein whether MSC-exosome treatment could restore thymic architecture and thymocyte development.

Exosomes were purified from the conditioned media of human Wharton's Jelly derived MSCs. New-born mice were exposed to hyperoxia (75% $O_2$), treated with MSC-exosomes on postnatal day 4 (PN4) and returned to room air on PN7. Treated animals and appropriate controls were harvested on PN7 and PN14. Thymic structure was analysed by histopathology of thymic architecture. Medullary epithelial cells were analysed for the expression of AIRE, a transcription factor that functions as an 'AutoImmune REgulator' to prevent the immune system from attacking self. AIRE protein levels were detected by immunofluorescence and thymocyte count by flow cytometry analysis using the following antibodies: CD44-PE, CD25-FITC, CD3-BV510, CD4-PECy7 and CD8-PerCPCy5.5.

It was shown that MSC-Exosomes restored thymic architecture and thymocyte counts to control levels (FIGS. 1A-1D). MSC-exosome treatment also reduced oxygen-induced thymocyte apoptosis and promoted normal maturation of medullary TECs (FIG. 2A-2D). Further, MSC-exosome treatment restored the thymocyte progenitor population in the thymus (FIGS. 3A-3D). Lastly, MSC-Exosome treatment promoted the development of CD4+ T cells in the thymus but inhibited the development of CD8+ T cells (FIGS. 4A-4G).

Figure 5A:
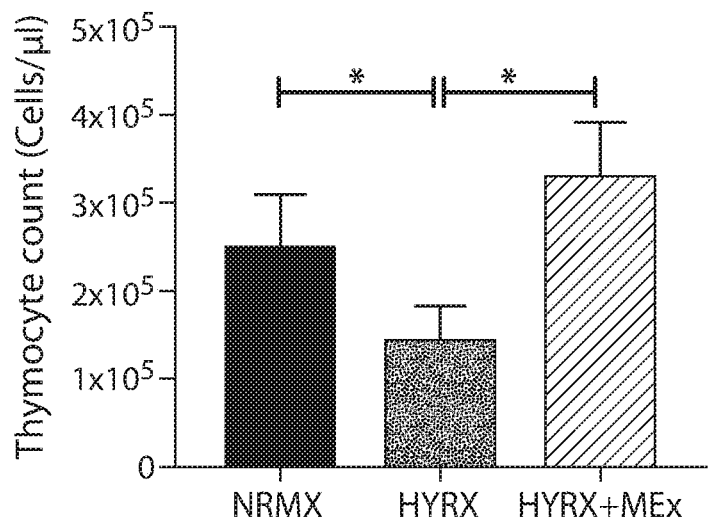
FIGS. 5A-5C. MEx prevents cellular apoptosis in the thymus of mice exposed to hyperoxia. The thymus of mice harvested at postnatal day 14 were assessed for overall thymocyte counts using countbright beads by flow cytometry and thymus slides of normoxia and hyperoxia-exposed mice (±MEx) were stained for TUNEL for detection of apoptotic cells
Figure 5B:
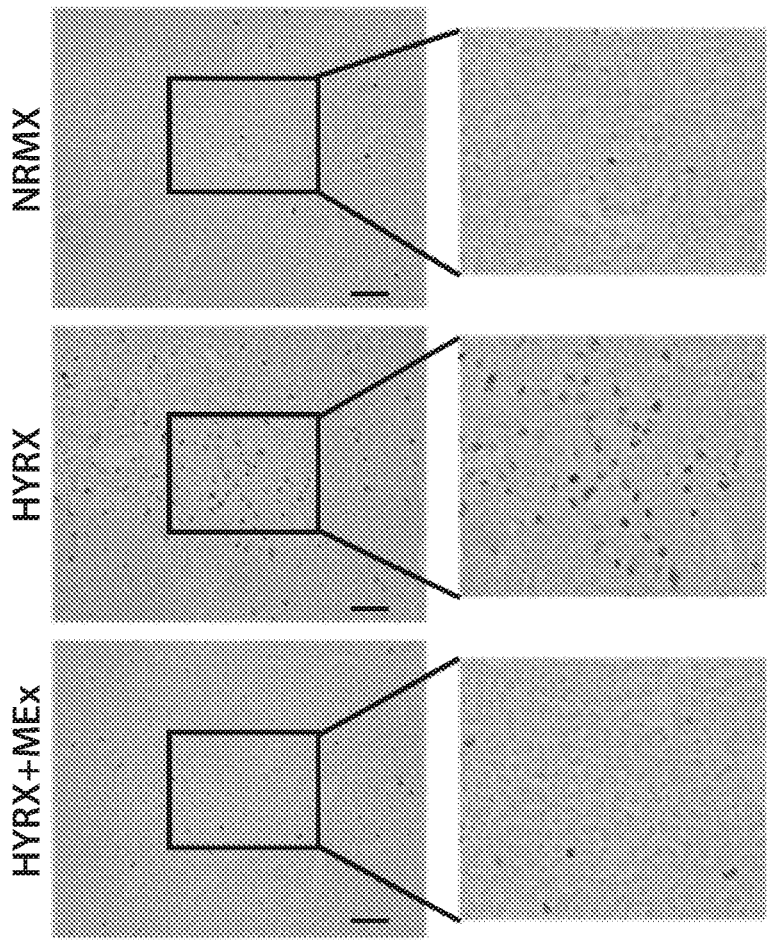
Figure 5C:
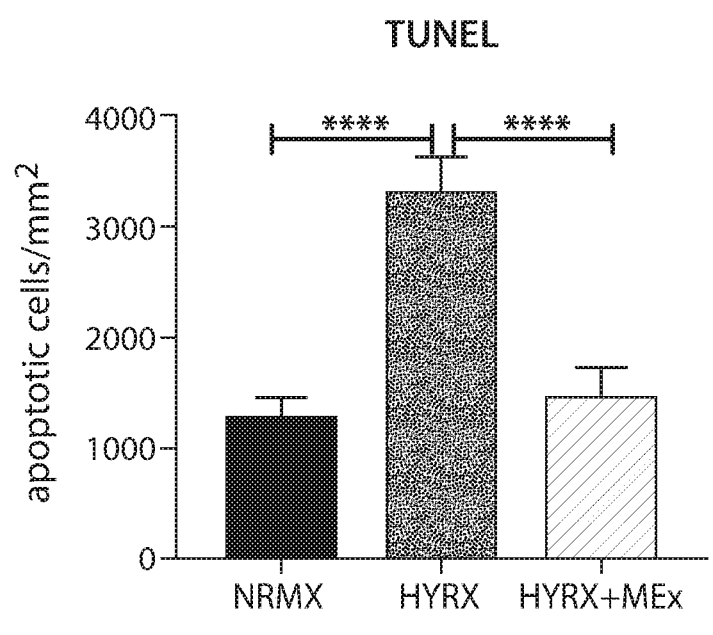
Figure 6A:
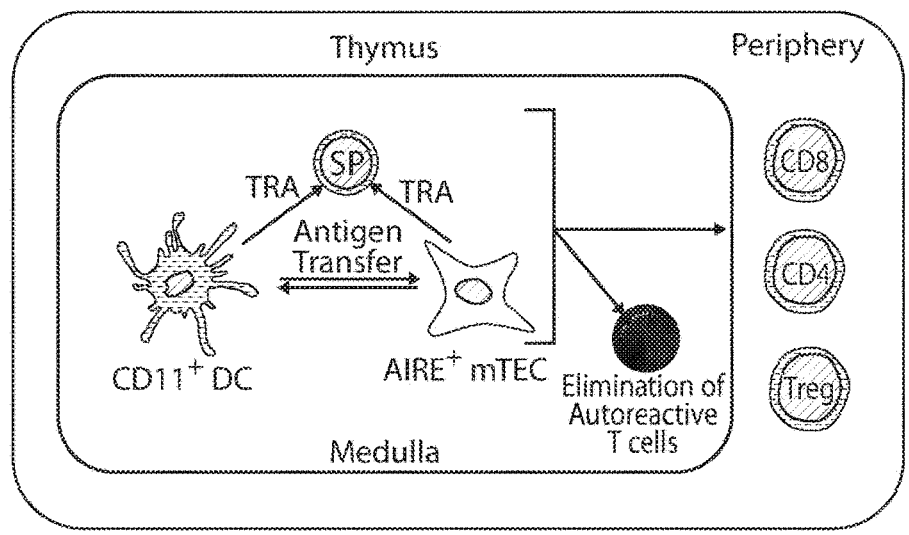
FIGS. 6A-6C MEx restores the phenotype of medullary antigen presenting cells after hyperoxic injury.
Figure 6B:
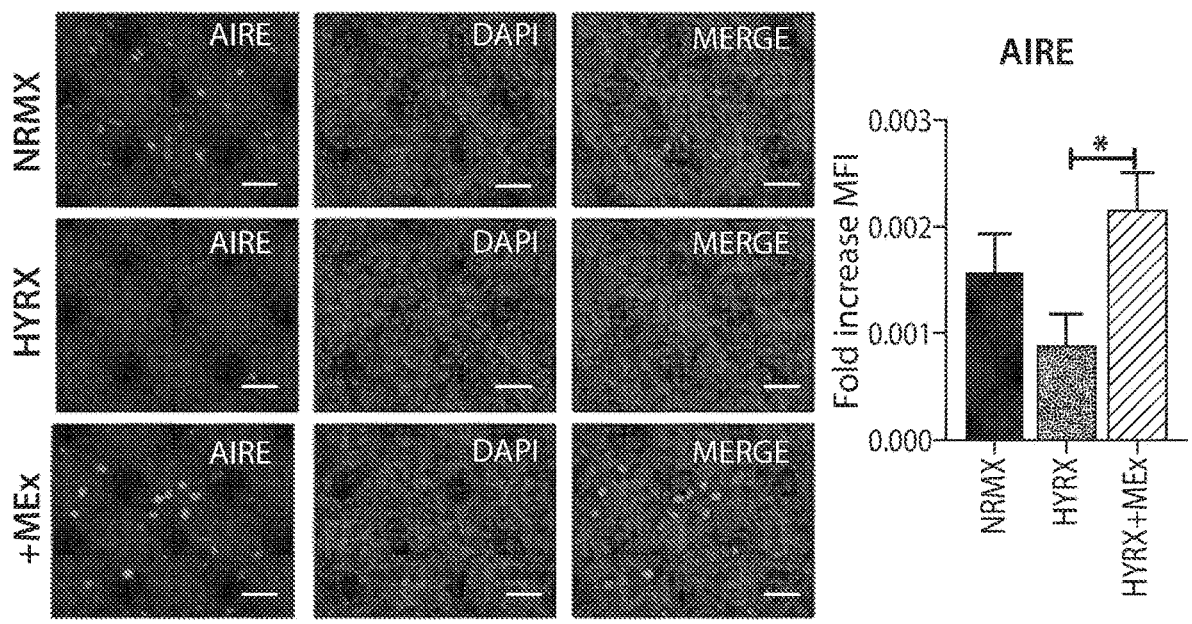
Figure 6C:
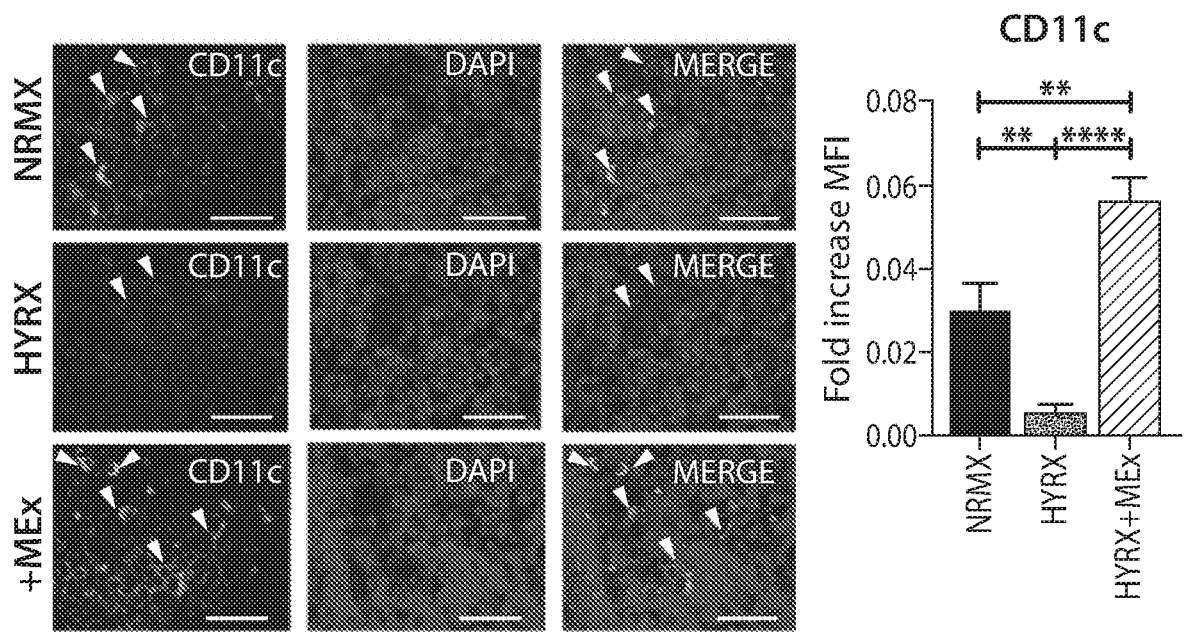
Figure 7A:
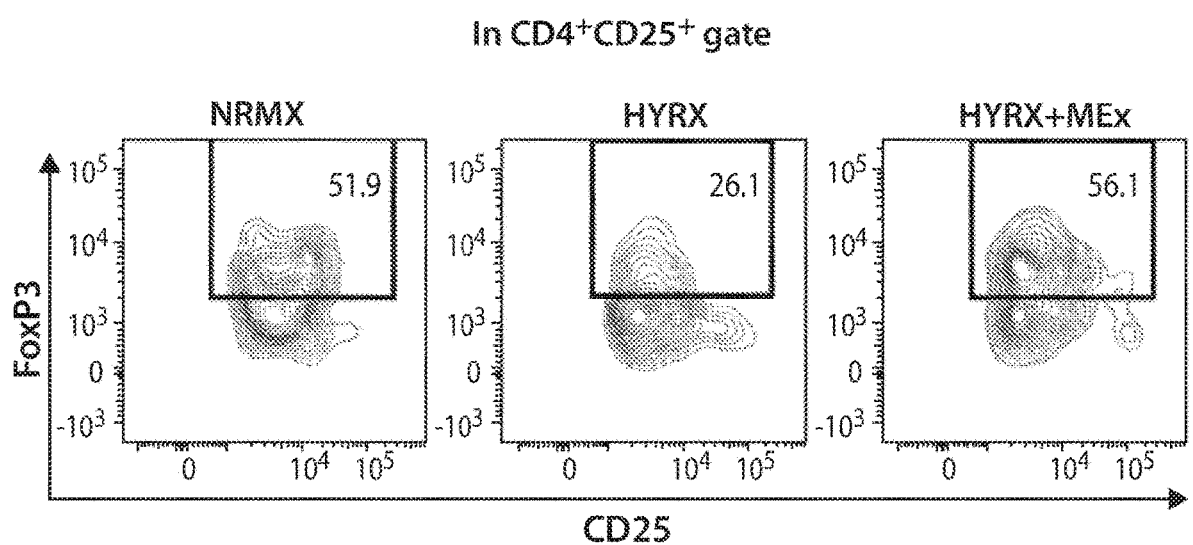
FIGS. 7A-7D. MEx restores the regulatory T cell phenotype at multi-organ level. To investigate whether MEx treatment had an effect on the generation of regulatory T cells, cell suspensions of thymi, lungs and spleens of mice harvested at postnatal day 14 were stained with regulatory T cell markers, i.e., CD4, CD25 and FoxP3 (thymi) or CD3, CD4, CD25 and FoxP3 (lungs and spleen) and assessed by cytometric analysis.
Figure 7B:
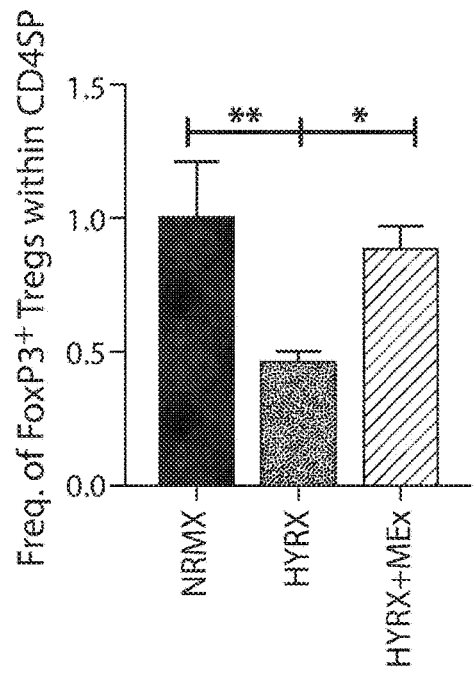
Figure 7C:
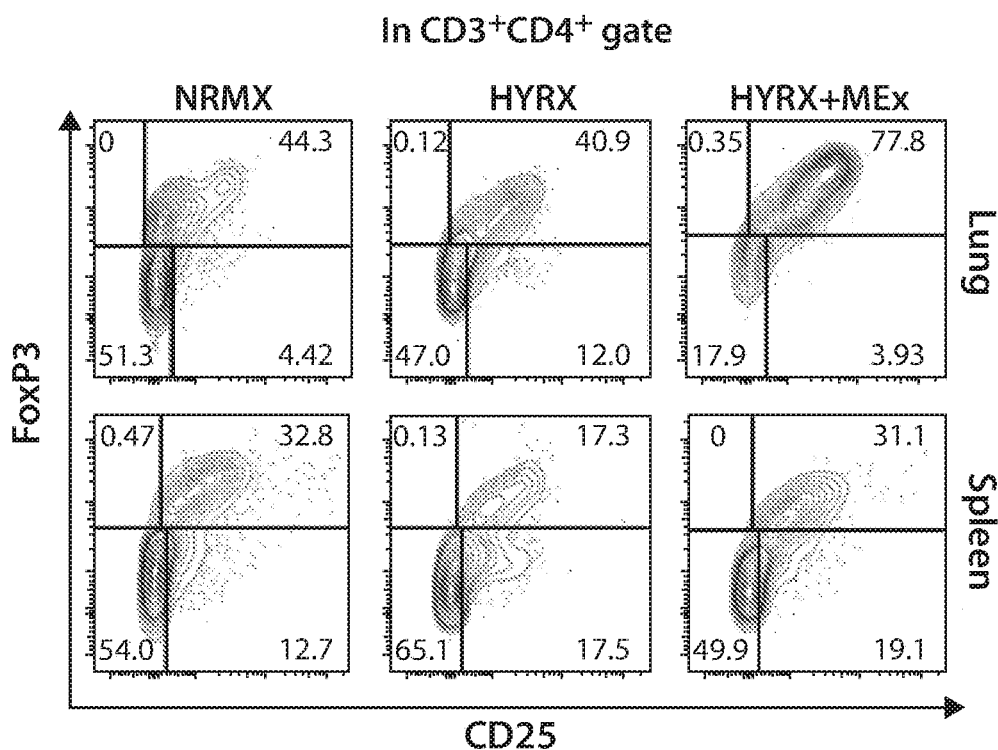
Figure 7D:
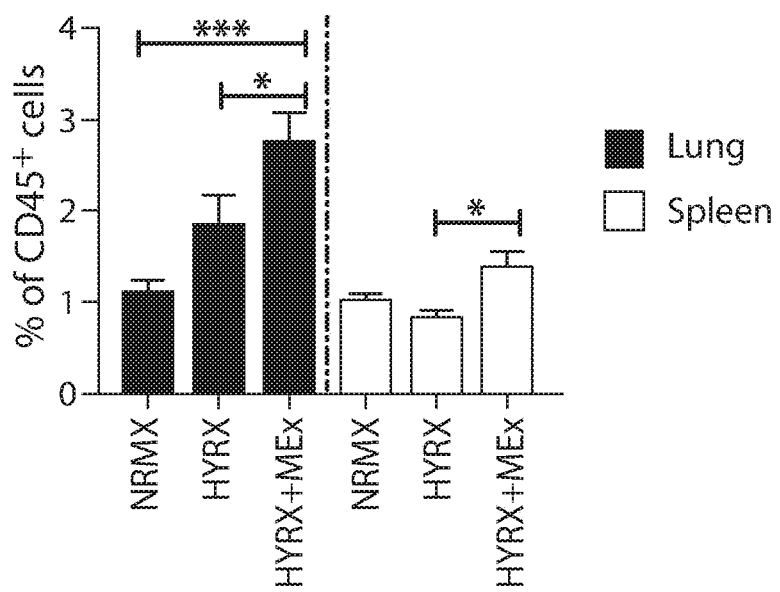

The data further shows that the MSC-exosomes prevented cellular apoptosis in the thymus of mice exposed to hyperoxia (FIGS. 5A-5C), restored the phenotype of medullary antigen presenting cells after hyperoxic injury (FIGS. 6A-6C), and restores the regulatory T cell phenotype at multi-organ level (7A-7D).

REFERENCES

1 Willis, G. R. et al. Mesenchymal Stromal Cell Exosomes Ameliorate Experimental Bronchopulmonary Dysplasia and Restore Lung Function Through Macrophage Immunomodulation. *American journal of respiratory and critical care medicine*, doi:10.1164/rccm.201705-0925OC (2017).

2 Takahama, Y., Ohigashi, I., Baik, S. & Anderson, G. Generation of diversity in thymic epithelial cells. *Nature reviews. Immunology* 17, 295-305, doi:10.1038/nri.2017.12 (2017).

3 Rosen, D. et al. Accelerated Thymic Maturation and Autoreactive T Cells in Bronchopulmonary Dysplasia. *American Journal of Respiratory and Critical Care Medicine* 174, 75-83, doi:10.1164/rccm.200511-1784OC (2006).

4 Angusamy, S. et al. Altered thymocyte and T cell development in neonatal mice with hyperoxia-induced lung injury. *Journal of perinatal medicine*, doi:10.1515/jpm-2016-0234 (2017).

All publications, patents, patent applications, publication, and database entries (e.g., sequence database entries) mentioned herein, e.g., in the Background, Summary, Detailed Description, Examples, and/or References sections, are hereby incorporated by reference in their entirety as if each individual publication, patent, patent application, publication, and database entry was specifically and individually incorporated herein by reference. In case of conflict, the present application, including any definitions herein, will control.

EQUIVALENTS AND SCOPE

Those skilled in the art will recognize, or be able to ascertain using no more than routine experimentation, many equivalents of the embodiments described herein. The scope of the present disclosure is not intended to be limited to the above description, but rather is as set forth in the appended claims.

Articles such as "a," "an," and "the" may mean one or more than one unless indicated to the contrary or otherwise evident from the context. Claims or descriptions that include "or" between two or more members of a group are considered satisfied if one, more than one, or all of the group members are present, unless indicated to the contrary or otherwise evident from the context. The disclosure of a group that includes "or" between two or more group members provides embodiments in which exactly one member of the group is present, embodiments in which more than one members of the group are present, and embodiments in which all of the group members are present. For purposes of brevity those embodiments have not been individually spelled out herein, but it will be understood that each of these embodiments is provided herein and may be specifically claimed or disclaimed.

It is to be understood that the disclosure encompasses all variations, combinations, and permutations in which one or more limitation, element, clause, or descriptive term, from one or more of the claims or from one or more relevant portion of the description, is introduced into another claim. For example, a claim that is dependent on another claim can be modified to include one or more of the limitations found in any other claim that is dependent on the same base claim. Furthermore, where the claims recite a composition, it is to be understood that methods of making or using the composition according to any of the methods of making or using disclosed herein or according to methods known in the art, if any, are included, unless otherwise indicated or unless it would be evident to one of ordinary skill in the art that a contradiction or inconsistency would arise.

Where elements are presented as lists, e.g., in Markush group format, it is to be understood that every possible subgroup of the elements is also disclosed, and that any element or subgroup of elements can be removed from the group. It is also noted that the term "comprising" is intended to be open and permits the inclusion of additional elements or steps. It should be understood that, in general, where an embodiment, product, or method is referred to as comprising particular elements, features, or steps, embodiments, products, or methods that consist, or consist essentially of, such elements, features, or steps, are provided as well. For purposes of brevity those embodiments have not been individually spelled out herein, but it will be understood that each of these embodiments is provided herein and may be specifically claimed or disclaimed.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in some embodiments, to the tenth of the unit of the lower limit of the range, unless the context clearly dictates otherwise. For purposes of brevity, the values in each range have not been individually spelled out herein, but it will be understood that each of these values is provided herein and may be specifically claimed or disclaimed. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range.

Where websites are provided, URL addresses are provided as non-browser-executable codes, with periods of the respective web address in parentheses. The actual web addresses do not contain the parentheses.

In addition, it is to be understood that any particular embodiment of the present disclosure may be explicitly excluded from any one or more of the claims. Where ranges are given, any value within the range may explicitly be excluded from any one or more of the claims. Any embodiment, element, feature, application, or aspect of the compositions and/or methods of the disclosure, can be excluded from any one or more claims. For purposes of brevity, all of the embodiments in which one or more elements, features, purposes, or aspects is excluded are not set forth explicitly herein.

What is claimed is:

1. A method of treating a thymic dysfunction, the method comprising administering to a subject in need thereof an effective amount of a mesenchymal stem cell (MSC) exosome, wherein the subject is a human subject, and wherein the human subject is born prematurely.

2. A method of treating a thymic dysfunction, the method comprising administering to a subject in need thereof an effective amount of a mesenchymal stem cell (MSC) exosome, wherein the subject is a human subject, and wherein the human subject was stressed at birth.

3. A method of treating a thymic dysfunction, the method comprising administering to a subject in need thereof an effective amount of a mesenchymal stem cell (MSC) exosome, wherein the subject is a human subject, and wherein the subject has been administered oxygen or has been on a ventilator.

4. A method of treating a thymic dysfunction, the method comprising administering to a subject in need thereof an effective amount of a mesenchymal stem cell (MSC) exosome, wherein the subject has oxygen-induced thymic involution.

5. The method of claim 1, wherein the subject has impaired innate and/or adaptive immunity.

6. The method of claim 1, wherein the MSC exosome is administered within one month of birth.

7. The method of claim 1, wherein the MSC exosome:
(a) restores thymic architecture;
(b) increases thymocyte counts;
(c) reduces thymocyte apoptosis;
(d) promotes maturation of medullary thymic epithelial cells; and/or
(e) restores thymocyte progenitor population in the thymus.

8. The method of claim 1, wherein the thymic dysfunction is an immune disorder.

9. The method of claim 2, wherein the subject has impaired innate and/or adaptive immunity.

10. The method of claim 2, wherein the MSC exosome is administered within one month of birth.

11. The method of claim 2, wherein the MSC exosome:
(a) restores thymic architecture;
(b) increases thymocyte counts;
(c) reduces thymocyte apoptosis;
(d) promotes maturation of medullary thymic epithelial cells; and/or
(e) restores thymocyte progenitor population in the thymus.

12. The method of claim 2, wherein the thymic dysfunction is an immune disorder.

13. The method of claim 3, wherein the subject has impaired innate and/or adaptive immunity.

14. The method of claim 3, wherein the MSC exosome is administered within one month of birth.

15. The method of claim 3, wherein the MSC exosome:
(a) restores thymic architecture;
(b) increases thymocyte counts;
(c) reduces thymocyte apoptosis;
(d) promotes maturation of medullary thymic epithelial cells; and/or
(e) restores thymocyte progenitor population in the thymus.

16. The method of claim 3, wherein the thymic dysfunction is an immune disorder.

17. The method of claim 4, wherein the subject has impaired innate and/or adaptive immunity.

18. The method of claim 4, wherein the MSC exosome is administered within one month of birth.

19. The method of claim 4, wherein the MSC exosome:
(a) restores thymic architecture;
(b) increases thymocyte counts;
(c) reduces thymocyte apoptosis;
(d) promotes maturation of medullary thymic epithelial cells; and/or
(e) restores thymocyte progenitor population in the thymus.

20. The method of claim 4, wherein the thymic dysfunction is an immune disorder.

* * * * *